United States Patent
Yamakawa et al.

(10) Patent No.: US 9,866,140 B2
(45) Date of Patent: Jan. 9, 2018

(54) AC/DC POWER CONVERTING APPARATUS WITH AC SOURCE SHORTCIRCUITING FOR POWER FACTOR CORRECTION AND HARMONIC SUPPRESSION

(71) Applicant: Mitsubishi Electric Corporation, Tokyo (JP)

(72) Inventors: Takashi Yamakawa, Tokyo (JP); Koichi Arisawa, Tokyo (JP); Yuji Takayama, Tokyo (JP); Shigeo Umehara, Tokyo (JP); Tomomi Higashikawa, Tokyo (JP); Makoto Tanikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/501,528

(22) PCT Filed: Sep. 30, 2014

(86) PCT No.: PCT/JP2014/076017
§ 371 (c)(1),
(2) Date: Feb. 3, 2017

(87) PCT Pub. No.: WO2016/051488
PCT Pub. Date: Apr. 7, 2016

(65) Prior Publication Data
US 2017/0222572 A1    Aug. 3, 2017

(51) Int. Cl.
*H02M 1/42*     (2007.01)
*H02M 7/06*     (2006.01)
(Continued)

(52) U.S. Cl.
CPC ............ *H02M 7/06* (2013.01); *H02M 1/08* (2013.01); *H02M 1/12* (2013.01); *H02M 1/42* (2013.01);
(Continued)

(58) Field of Classification Search
CPC ....... H02M 1/12; H02M 1/4208; H02M 7/066
(Continued)

(56) References Cited

U.S. PATENT DOCUMENTS 5,479,336 A    12/1995  Motoki et al.
5,615,098 A    3/1997   Ishii et al.
(Continued)

FOREIGN PATENT DOCUMENTS

JP    07-222448 A    8/1995
JP    08-168248 A    6/1996
(Continued)

OTHER PUBLICATIONS

International Search Report of the International Searching Authority dated Dec. 9, 2014 for the corresponding International application No. PCT/JP2014/076017 (and English translation).

*Primary Examiner* — Jeffrey Sterrett
(74) *Attorney, Agent, or Firm* — Posz Law Group, PLC

(57) ABSTRACT

A power converting apparatus includes a rectifier that converts alternating-current power from an alternating-current power supply into direct-current power, a short-circuit unit that short-circuits the alternating-current power supply via a reactor, and a control unit that controls a short-circuit operation of the short-circuit unit. The control unit changes the number of times of the short-circuit operation during a half cycle of the alternating-current power supply on the basis of a load condition and sets a period from a start to an end of the short-circuit operation during the half cycle of the alternating-current power supply after the change of the
(Continued)

number of times of the short-circuit operation to be different from a period from a start to an end of the short-circuit operation during the half cycle of the alternating-current power supply before the change of the number of times of the short-circuit operation.

38 Claims, 14 Drawing Sheets

(51) Int. Cl.
*H02M 1/12* (2006.01)
*H02M 1/08* (2006.01)
*H02M 1/00* (2006.01)

(52) U.S. Cl.
CPC ............... H02M 2001/0009 (2013.01); H02M 2001/0048 (2013.01)

(58) Field of Classification Search
USPC ................................. 363/44, 84, 89, 125, 126
See application file for complete search history.

(56) References Cited

U.S. PATENT DOCUMENTS

| | | | |
|---|---|---|---|
| 5,936,854 A * | 8/1999 | Uesugi | H02M 1/4208 323/299 |
| 5,949,226 A | 9/1999 | Tanaka et al. | |
| 6,157,182 A | 12/2000 | Tanaka et al. | |
| 6,181,539 B1 * | 1/2001 | Maejima | H02M 1/4208 361/22 |
| 7,274,579 B2 * | 9/2007 | Ueda | H02M 5/458 363/125 |
| 8,508,165 B2 * | 8/2013 | Shinomoto | H02M 1/126 318/375 |
| 2008/0130336 A1 | 6/2008 | Taguchi | |
| 2010/0142238 A1 * | 6/2010 | Viitanen | H02M 1/4208 363/126 |
| 2011/0026285 A1 * | 2/2011 | Kawashima | H02M 1/4208 363/127 |
| 2011/0227522 A1 * | 9/2011 | Shinomoto | H02M 1/4225 318/400.29 |
| 2014/0204491 A1 * | 7/2014 | Shimomugi | H02M 7/06 361/84 |
| 2014/0225552 A1 * | 8/2014 | Shinomoto | H02M 1/4208 318/504 |
| 2015/0256083 A1 * | 9/2015 | Ito | H02M 3/335 363/16 |
| 2017/0070157 A1 * | 3/2017 | Tsukii | H02P 7/24 |
| 2017/0149352 A1 * | 5/2017 | Arisawa | H02M 7/06 |
| 2017/0207718 A1 * | 7/2017 | Shimomugi | H02M 7/06 |
| 2017/0222572 A1 * | 8/2017 | Yamakawa | H02M 7/003 |

FOREIGN PATENT DOCUMENTS

| | | |
|---|---|---|
| JP | 08-289535 A | 11/1996 |
| JP | 2763479 B2 | 6/1998 |
| JP | 2000-217363 A | 8/2000 |
| JP | 2002-101666 A | 4/2002 |
| JP | 3485047 B2 | 1/2004 |
| JP | 2005-253284 A | 9/2005 |
| JP | 2006-174689 A | 6/2006 |
| JP | 2008-193815 A | 8/2008 |
| JP | 2009-100499 A | 5/2009 |
| JP | 2010-207018 A | 9/2010 |
| JP | 2011-101505 A | 5/2011 |
| JP | 2013-106455 A | 5/2013 |
| JP | 2015-070724 A | 4/2015 |
| JP | 2015-171196 A | 9/2015 |

* cited by examiner

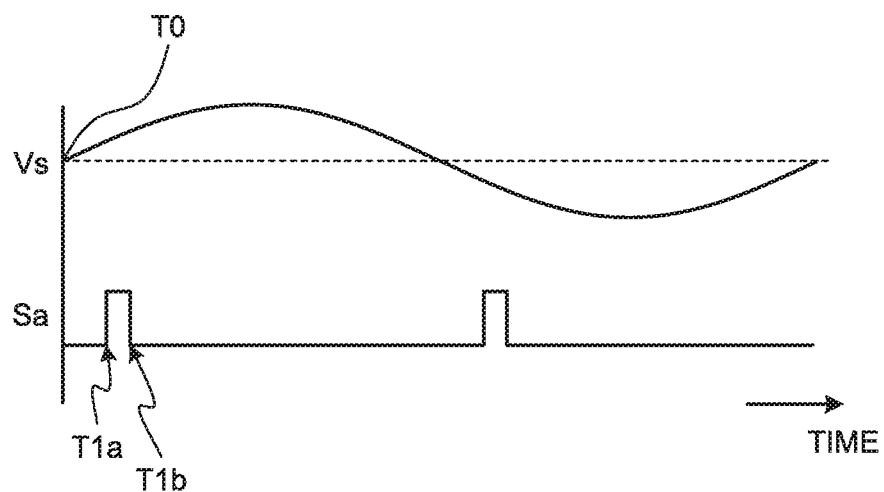
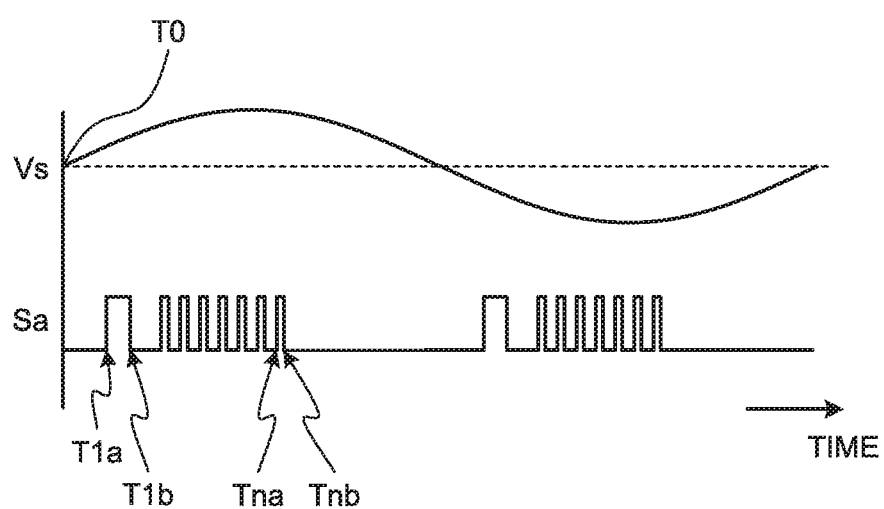

AC/DC POWER CONVERTING APPARATUS WITH AC SOURCE SHORTCIRCUITING FOR POWER FACTOR CORRECTION AND HARMONIC SUPPRESSION

CROSS REFERENCE TO RELATED APPLICATION

This application is a U.S. national stage application of International Patent Application No. PCT/JP2014/076017 filed on Sep. 30, 2014, the disclosure of which is incorporated herein by reference.

TECHNICAL FIELD

The present invention relates to a power converting apparatus that converts alternating-current power into direct-current power.

BACKGROUND

A direct-current power supply apparatus disclosed in Patent Literature 1 described below is configured to feed an electric current to a reactor by short-circuiting switch means only once during a power supply half cycle and suppress a harmonic current and improve a power factor. However, when the switch means is short-circuited only once during the power supply half cycle, it is necessary to increase an inductance value of the reactor to suppress harmonics. Further, heat generation in the reactor increases when the inductance value increases. This is because, after an input current is fed by the operation of the switch means, when the input current decreases to zero, not only the power factor is deteriorated but a harmonics amount of a high-order component increases to be larger than usual. Further, this is because, in the short-circuit performed only once, to prevent the input current from decreasing to zero, it is necessary to store large energy in the reactor.

In a conventional technology of Patent Literature 2 described below, by short-circuiting the switch means twice or more in the power supply half cycle, it is possible to reduce the inductance value of the reactor and reduce the heat generation. Further, when the inductance value decreases, because the external shape of the reactor also decreases, it is possible to reduce the reactor in size.

PATENT LITERATURE

Patent Literature 1: Japanese Patent No. 2763479
Patent Literature 2: Japanese Patent No. 3485047

In the conventional technologies represented by Patent Literatures 1 and 2 described above, when a factor such as a power factor, a loss, harmonics, noise, or a design load is taken into account, the number of times of switching during the power supply half cycle of the switch means is different depending on a load condition. Therefore, when these factors are taken into account, it is necessary to switch the number of times of switching during operation. However, a direct-current voltage suddenly changes unless a short-circuit operation time is appropriately controlled during the switching of the number of times of switching. The operation stops because of a fault such as instability of direct-current voltage control, an overvoltage, or voltage shortage. A load that uses the direct-current voltage is sometimes adversely affected.

SUMMARY

The present invention has been devised in view of the above and an object of the present invention is to obtain a power converting apparatus that can suppress fluctuation in a direct-current voltage even when the number of times of switching of a short-circuit unit, which short-circuits an alternating-current power supply, is changed according to a load.

In order to solve the aforementioned problem and achieve the object, the present invention provides a power converting apparatus including: a rectifier that converts alternating-current power from an alternating-current power supply into direct-current power; a short-circuit unit that short-circuits the alternating-current power supply via a reactor; and a control unit that controls a short-circuit operation of the short-circuit unit. The control unit changes a number of times of the short-circuit operation during a half cycle of the alternating-current power supply on the basis of a load condition and sets a period from a start to an end of the short-circuit operation during the half cycle of the alternating-current power supply after the change of the number of times of the short-circuit operation to be different from a period from a start to an end of the short-circuit operation during the half cycle of the alternating-current power supply before the change of the number of times of the short-circuit operation.

Advantageous Effects of Invention

The power converting apparatus according to the present invention achieves an effect that it is possible to suppress fluctuation in a direct-current voltage even when the number of times of switching of a short-circuit unit, which short-circuits an alternating-current power supply, is changed according to a load condition.

BRIEF DESCRIPTION OF DRAWINGS

FIG. 13 is a diagram showing a driving signal for switching a short-circuit unit once during the power supply half cycle.

FIG. 14 is a diagram showing a driving signal for switching the short-circuit unit a plurality of times during the power supply half cycle.

DETAILED DESCRIPTION

Power converting apparatuses according to embodiments of the present invention are explained in detail below with reference to the drawings. Note that the present invention is not limited by the embodiments.

First Embodiment.

Figure 1:
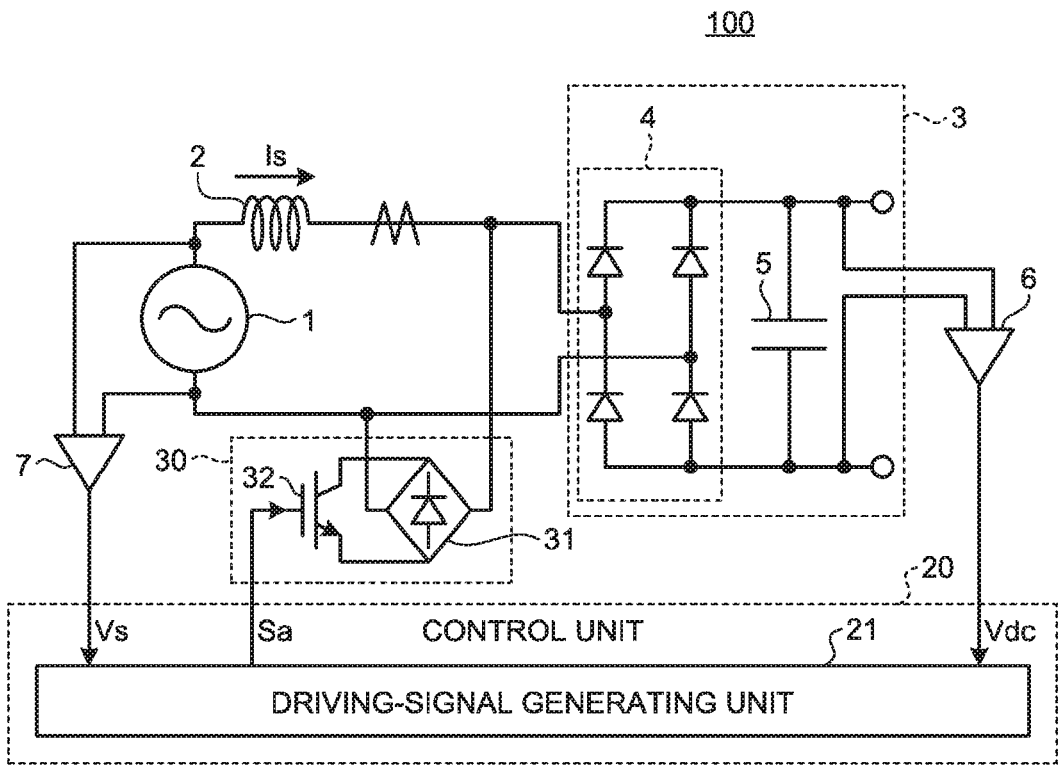
FIG. 1 is a diagram showing a configuration example of a power converting apparatus according to a first embodiment of the present invention.

FIG. 1 is a diagram showing a configuration example of a power converting apparatus 100 according to a first embodiment of the present invention. The power converting apparatus 100 includes a rectifier 3 that converts alternating-current power from an alternating-current power supply 1, which is a power supply unit, into direct-current power, a reactor 2 connected between the alternating-current power supply 1 and the rectifier 3, a power-supply-voltage detecting unit 7 that detects a power supply voltage Vs of the alternating-current power supply 1, a short-circuit unit 30 that short-circuits the alternating-current power supply 1 via the reactor 2, and a control unit 20 that generates a driving signal Sa, which is one or a plurality of switching pulses, during a half cycle of the alternating-current power supply 1 and controls opening and closing operation of the short-circuit unit 30 with the generated driving signal Sa.

The reactor 2 is connected further to the alternating-current power supply 1 side than the short-circuit unit 30 and, in an example shown in the figure, inserted between one input end of the rectifier 3 and the alternating-current power supply 1.

The rectifier 3 includes a rectifier circuit 4 configured by a diode bridge 31 in which four diodes are combined and a smoothing capacitor 5 that is connected between output ends of the rectifier circuit 4 and smoothes a voltage having a full-wave rectification waveform output from the rectifier circuit 4.

A DC-voltage detecting unit 6 is realized by an amplifier or a level shift circuit, detects a voltage across both ends of the smoothing capacitor 5, and converts the detected voltage into a direct-current voltage Vdc, which is a voltage detection value within a low voltage range that the control unit 20 can handle, and outputs the direct-current voltage Vdc. Note that the configuration of the rectifier circuit 4 is not limited to this. The rectifier circuit 4 can be configured by combining a metal-oxide-film-semiconductor field effect transistor, which is a diode-connected unidirectional conduction element.

The short-circuit unit 30, which is a bidirectional switch, is configured by the diode bridge 31 connected in parallel to the alternating-current power supply 1 via the reactor 2 and a short-circuit element 32 connected to both output ends of the diode bridge 31. When the short-circuit element 32 is a metal-oxide-film-semiconductor field effect transistor, a gate of the short-circuit element 32 is connected to a driving-signal generating unit 21 of the control unit 20. The short-circuit element 32 is turned on and off by the driving signal Sa from the driving-signal generating unit 21. When the short-circuit element 32 is turned on, the alternating-current power supply 1 is short-circuited via the reactor 2 and the diode bridge 31.

The control unit 20 is configured by a microcomputer and includes the driving-signal generating unit 21 that generates the driving signal Sa, which is a switching pulse for controlling the short-circuit element 32 on the basis of the direct-current voltage Vdc and the power supply voltage Vs.

The driving-signal generating unit 21 causes, in current open loop control of a short-circuit operation mode, the short-circuit unit 30 to perform on/off operation once or a plurality of times during a power supply half cycle. The operation of the driving-signal generating unit 21 is explained with reference to FIG. 2.

Figure 2:
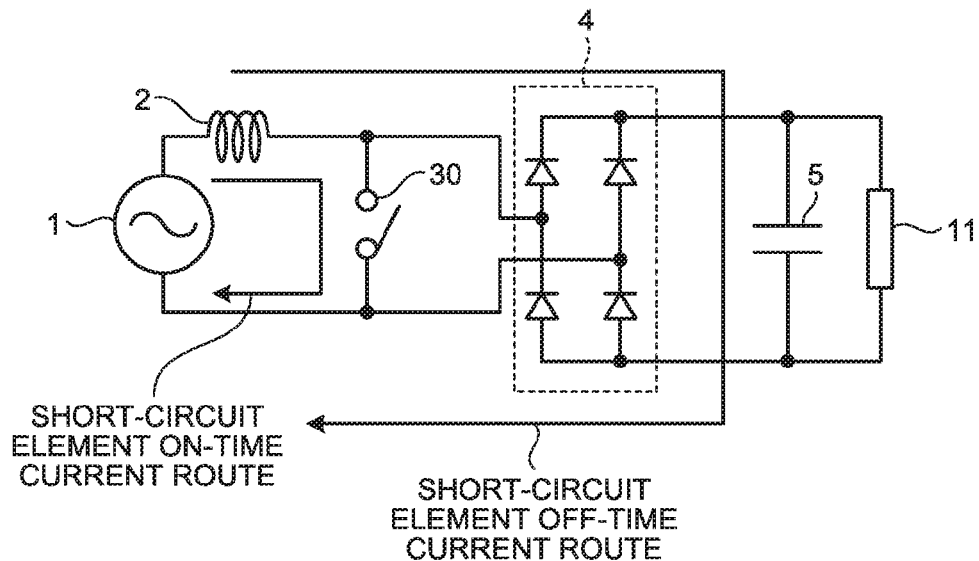
FIG. 2 is a diagram showing a simple circuit including a reactor, a short-circuit unit, a rectifier circuit, and a smoothing capacitor.

FIG. 2 is a diagram showing a simple circuit including the reactor 2, the short-circuit unit 30, the rectifier circuit 4, and the smoothing capacitor 5. In FIG. 2, a current route during on/off of the short-circuit unit 30 is shown.

Figure 3:
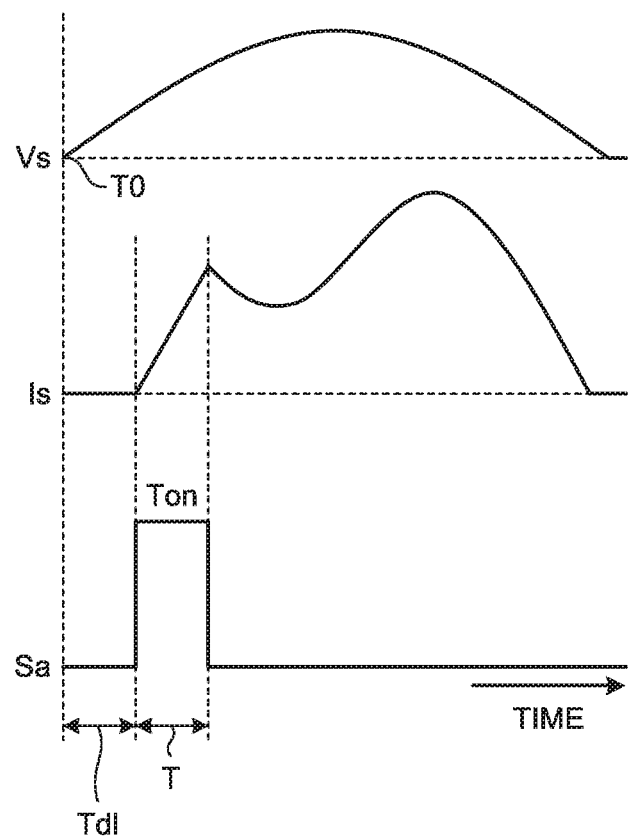
FIG. 3 is a diagram showing a waveform of a power supply current at the time when a short-circuit element is short-circuited once in a positive electrode side half cycle of an alternating-current power supply.

FIG. 3 is a diagram showing a waveform of a power supply current Is at the time when the short-circuit element 32 is short-circuited once in a positive electrode side half cycle of the alternating-current power supply 1. In FIG. 3, a waveform of the power supply voltage Vs in a power supply half cycle on a positive electrode side, a waveform of the power supply current Is flowing to the reactor 2, and a waveform of the driving signal Sa, which is a single pulse at the time when the short-circuit unit 30 is short-circuited once are shown.

Td1 represents an ON start time when the driving signal Sa is turned on at a point in time when a fixed time elapses from a zero-cross point T0 in a rise of the power supply voltage Vs. Ton is an ON time of the driving signal Sa generated with the positive electrode side half cycle of the power supply voltage. T represents a period until the driving signal Sa is turned off after being turned on. In an example shown in the figure, the ON time Ton and the period T have the same width because the number of pulses of the driving signal Sa is one.

The short-circuit unit 30 is turned on by turning on the driving signal Sa at a point in time when the ON start time Td1 elapses. At this point, a closed circuit is formed by the alternating-current power supply 1, the reactor 2, and the short-circuit unit 30. The alternating-current power supply 1 is short-circuited via the reactor 2. Therefore, the power supply current Is flows to the closed circuit. Magnetic energy calculated by (½)×LI² is accumulated in the reactor 2. When the short-circuit unit 30 is turned off, the accumulated energy is simultaneously discharged to a load 11 side, rectified by the rectifier circuit 4, and transferred to the smoothing capacitor 5. The power supply current Is flows through a route shown in FIG. 2 according to the series of operation. Consequently, it is possible to increase an energization angle of the power supply current Is to be wider than an energization angle in a passive mode without power factor improvement. It is possible to improve a power factor.

In a short-circuit operation mode, by controlling the widths of the ON start time Td1 and the ON time Ton of the short-circuit unit 30, it is possible to control energy accumulated in the reactor 2. It is possible to steplessly raise the direct-current voltage Vdc to a specific value.

In FIG. 3, an example is shown in which the short-circuit unit 30 is switched once during the power supply half cycle. However, depending on a load condition, the number of times of switching is increased for the purpose of power factor improvement, harmonics suppression, or raising of the direct-current voltage. Note that the switching indicates a short-circuit operation of the short-circuit unit 30 and the number of times of switching indicates the number of times of the short-circuit operation of the short-circuit unit 30.

Figure 4:
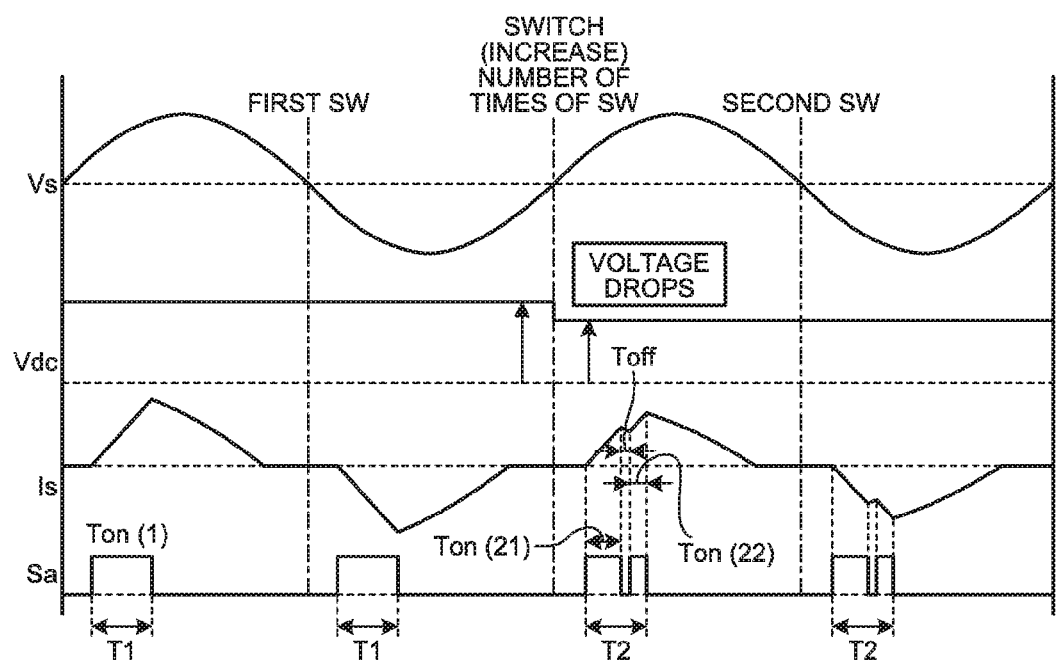
FIG. 4 is a first diagram showing fluctuation in a direct-current voltage detected when the number of times of switching during a power supply half cycle increases from one to two.

FIG. 4 is a first diagram showing fluctuation in the direct-current voltage Vdc detected when the number of times of switching during the power supply half cycle increase from one to two.

In FIG. 4, as an example, a waveform of the power supply voltage Vs for two cycles, a waveform of the direct-current voltage Vdc detected by the DC-voltage detecting unit 6, a waveform of the power supply current Is flowing to the reactor 2, and a waveform of the driving signal Sa are shown. Specifically, states of changes of the waveforms of the direct-current voltage Vdc and the power supply current Is at the time when the number of times of switching is changed from one to two at timing between a first cycle and a second cycle of the power supply voltage are shown. Note that, in an operation example shown in FIG. 4, the number of times of switching is switched between the first cycle and the second cycle of the power supply voltage. A value of the direct-current voltage Vdc represents an average in the first cycle of the power supply voltage and an average in the second cycle of the power supply voltage.

The numbers of times of switching in the positive electrode side half cycle and the negative electrode side half cycle of the first cycle of the power supply voltage are respectively one. The numbers of times of switching in the positive electrode side half cycle and the negative electrode side half cycle of the second cycle of the power supply voltage are respectively two.

Ton(1) is an ON time of the driving signal Sa generated within the positive electrode side half cycle of the first cycle of the power supply voltage. T1 is a period until the driving signal Sa is turned off after being turned on. The ON time Ton(1) and the period T1 have the same width. Note that, in FIG. 4, an ON time of the driving signal Sa generated during the negative electrode side half cycle of the first cycle of the power supply voltage is not shown.

Ton(21) is an ON time of a first driving signal Sa of two driving signals Sa generated within the positive electrode side half cycle of the second cycle of the power supply voltage. Ton(22) is an ON time of a second driving signal Sa of the two driving signals Sa. Toff is an open time until the second driving signal Sa is turned on after the first driving signal Sa is turned off. T2 is a period until the second driving signal Sa is turned off after the first driving signal Sa is turned on. Specifically, the period T2 is a period obtained by adding up time until the first driving signal Sa is turned off after being turned on, time until the second driving signal Sa is turned on after the first driving signal Sa is turned off, and time until the second driving signal Sa is turned off after being turned on. That is, the period T2 is equal to time obtained by adding up the ON time Ton(21), the OFF time Toff, and the ON time Ton(22).

In the operation example shown in FIG. 4, the period T2 is equal to the period T1. When the period T2 is equal to the period T1, time obtained by adding up the ON time Ton (21) and the ON time Ton(22) is relatively smaller than the ON time Ton(1).

When focusing on the direct-current voltage Vdc, it is seen that the direct-current voltage Vdc drops when the number of times of switching is switched. Specifically, the switching is performed twice in the period T2 under a condition that the period T2 and the period T1 are equal. Therefore, the time obtained by adding up the ON time Ton(21) and the ON time Ton(22) is smaller than the ON time Ton(1). The direct-current voltage Vdc after the increase of the number of times of switching drops to be lower than the direct-current voltage Vdc before the increase of the number of times of switching.

Figure 5:
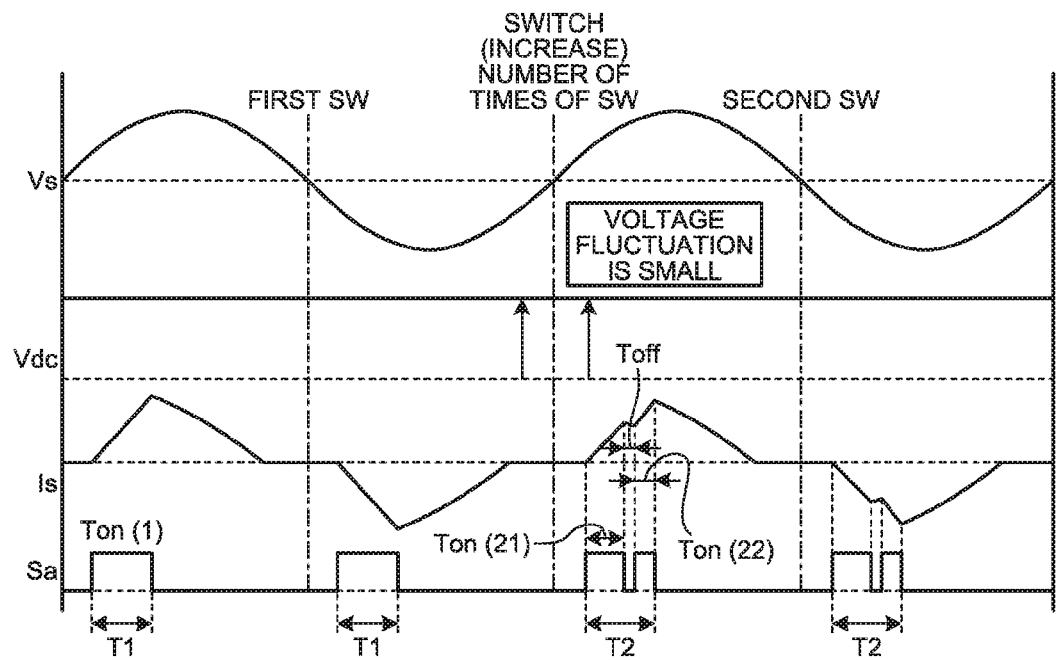
FIG. 5 is a second diagram showing the fluctuation in the direct-current voltage detected when the number of times of switching during the power supply half cycle increases from one to two.

FIG. 5 is a second diagram showing the fluctuation in the direct-current voltage Vdc detected when the number of times of switching during the power supply half cycle increases from one to two. In FIG. 5, the fluctuation of the direct-current voltage Vdc before and after the increase of the number of times of switching is small and is an equal value. The fluctuation in the direct-current voltage Vdc is small because the time obtained by adding up the ON time Ton(21) and the ON time Ton(22) is equal to the ON time Ton(1). When the number of times of switching during the power supply half cycle is increased from one to two, to obtain a stable direct-current voltage Vdc in this way, it is necessary to set the period T2 larger than the period T1.

In FIGS. 4 and 5, the example is explained in which the number of times of switching is increased from one to two. However, the number of times of switching is not limited to this. That is, the number of driving signals Sa generated during the power supply half cycle only has to be larger after the number of times of switching is switched than before the number of times of switching is switched.

Figure 6:
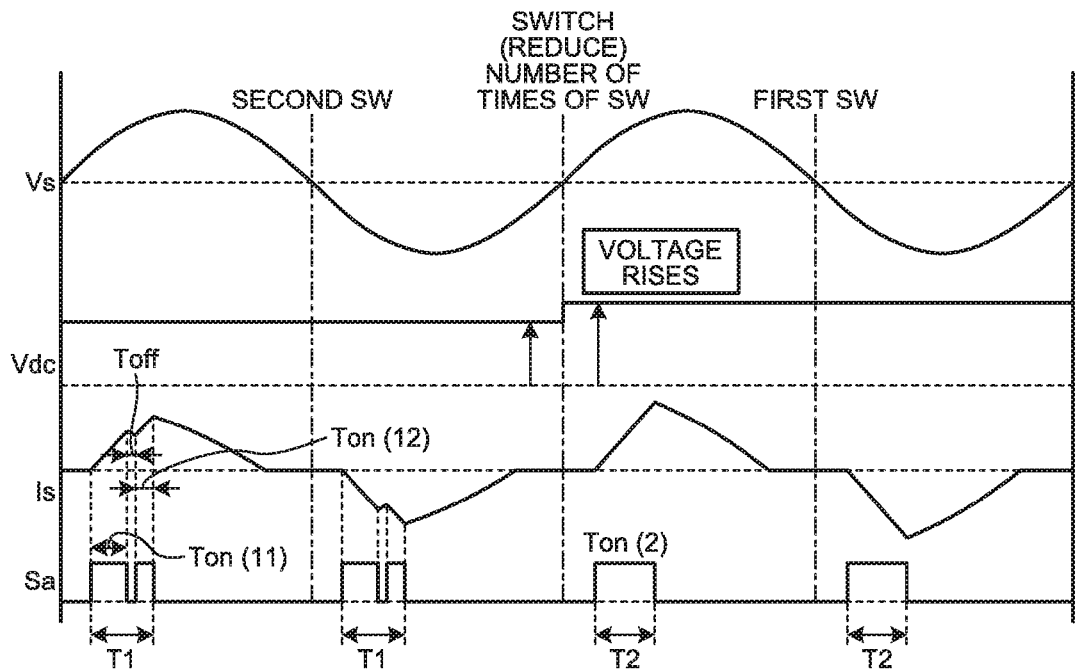
FIG. 6 is a first diagram showing fluctuation in a direct-current voltage detected when the number of times of switching during the power supply half cycle decreases from two to one.

FIG. 6 is a first diagram showing fluctuation in the direct-current voltage Vdc detected when the number of times of switching during the power supply half cycle decreases from two to one.

In FIG. 6, a state of changes of waveforms of the direct-current voltage Vdc and the power supply current Is at the time when the number of times of switching changes from two to one at the timing between the first cycle and the second cycle of the power supply voltage.

The numbers of times of switching in the positive electrode side half cycle and the negative electrode side half cycle of the first cycle of the power supply voltage are respectively two. The number of times of switching in the positive electrode side half cycle and the negative electrode side half cycle of the second cycle of the power supply voltage are respectively one.

Ton(11) is an ON time of the first driving signal Sa of the two driving signals Sa generated within the positive electrode side half cycle of the first cycle of the power supply voltage. Ton(12) is an ON time of the second driving signal Sa of the two driving signals Sa. Toff is an OFF time until the second driving signal Sa is turned on after the first driving signal Sa is turned off. T1 is a period until the second driving signal Sa is turned off after the first driving signal Sa is turned on. Specifically, the period T1 is a period obtained by adding up time until the first driving signal Sa is turned off after being turned on, time until the second driving signal Sa is turned on after the first driving signal Sa is turned off, and time until the second driving signal Sa is turned off after being turned on. That is, the period T2 is equal to a period obtained by adding up the ON time Ton(11), the OFF time Toff, and the ON time Ton(12).

Ton(2) is an ON time of the driving signal Sa generated within the positive electrode side half cycle of the second cycle of the power supply voltage. T2 is a period until the driving signal Sa is turned off after being turned on. The ON time Ton(2) and the period T2 have the same width.

In an operation example shown in FIG. 6, the period T1 and the period T2 are equal. When the period T1 and the period T2 are equal, the ON time Ton(2) is relatively larger than time obtained by adding up the ON time Ton(11) and the ON time Ton(12).

When focusing on the direct-current voltage Vdc, it is seen that the direct-current voltage Vdc rises when the number of times of switching is switched. Specifically, the switching is performed twice in the period T1 under a condition that the period T2 and the period T1 are equal. Therefore, the time obtained by adding up the ON time Ton(11) and the ON time Ton(12) is smaller than the ON time Ton(2). The direct-current voltage Vdc after the decrease of the number of times of switching rises to be higher than the direct-current voltage Vdc before the decrease of the number of times of switching.

Figure 7:
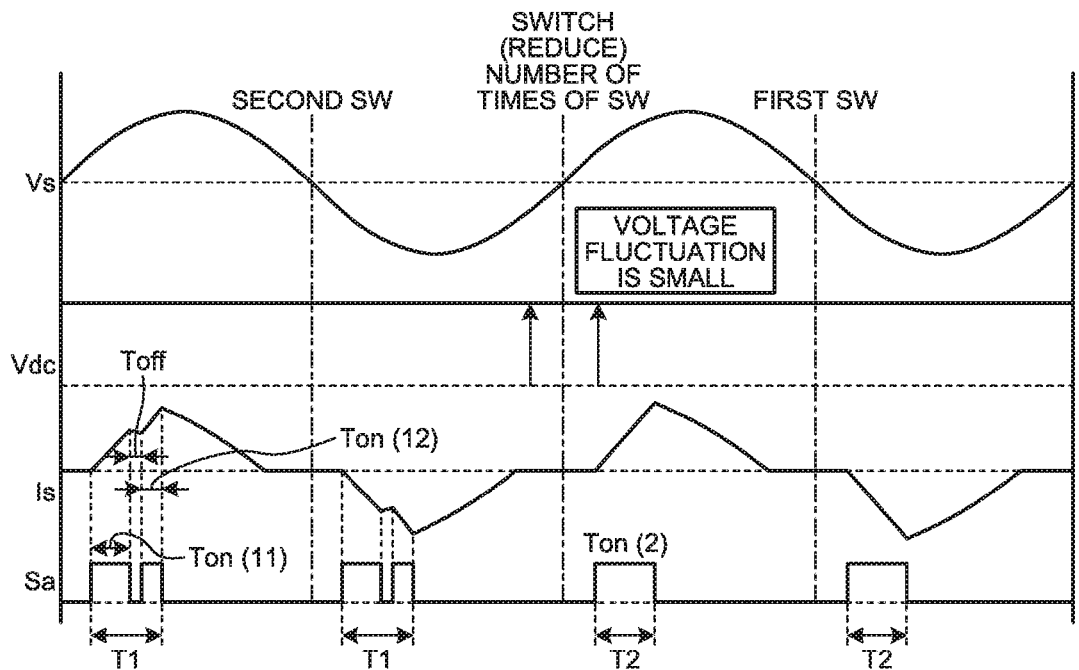
FIG. 7 is a second diagram showing the fluctuation in the direct-current voltage detected when the number of times of switching during the power supply half cycle decreases from two to one.

FIG. 7 is a second diagram showing the fluctuation in the direct-current voltage detected when the number of times of switching during the power supply half cycle decreases from two to one. In FIG. 7, fluctuation in the direct-current voltage Vdc before and after the decrease of the number of times of switching and is an equal value. The fluctuation in the direct-current voltage Vdc is small because the time obtained by adding up the ON time Ton(11) and the ON time Ton(12) is equal to the ON time Ton(2). When then number of times of switching is reduced in this way, to obtain the stable direct-current voltage Vdc, it is necessary to set the period T2 smaller than the period T1.

In FIGS. 6 and 7, the example is explained in which the number of times of switching is reduced from two to one. However, the number of times of switching is not limited to this. That is, the number of driving signals Sa generated by the driving-signal generating unit 21 during the power supply half cycle only has to be smaller after the number of times of switching is switched than before the number of times of switching is switched.

In the power converting apparatus 100 in the first embodiment, when the number of times of switching is changed according to a load condition, it is possible to suppress fluctuation in the power supply voltage by appropriately controlling the lengths of the periods T1 and T2 according to a tendency of the change of the number of times of switching. Therefore, it is possible to construct a system having high stability. It is possible to raise the direct-current voltage to a voltage higher than the voltage of the conventional converter while improving a power factor and suppressing harmonics.

The power converting apparatus 100 in the first embodiment is configured to appropriately control the lengths of the periods T1 and T2 according to a tendency of the change of the number of times of switching. Therefore, it is possible to suppress an increase in a load involved in tuning of unnecessary parameters.

In the power converting apparatus 100 in the first embodiment, it is possible to appropriately control the lengths of the periods T1 and T2 according to a load condition. Therefore, it is possible to suppress the number of times of switching at the time of a relatively low load. It is possible to suppress an increase in a switching loss.

Note that the control unit 20 in the first embodiment controls, according to timing of switching of the number of times of switching, the length of a period from a short-circuit start to a short-circuit end in the power supply half cycle after the change of the number of times of switching. However, the length of the period can be divided into a plurality of timings and controlled in a range in which fluctuation in a voltage can be allowed. It goes without saying that the same effect can be obtained even if the power converting apparatus 100 is configured in this way.

Second Embodiment.

Figure 8:
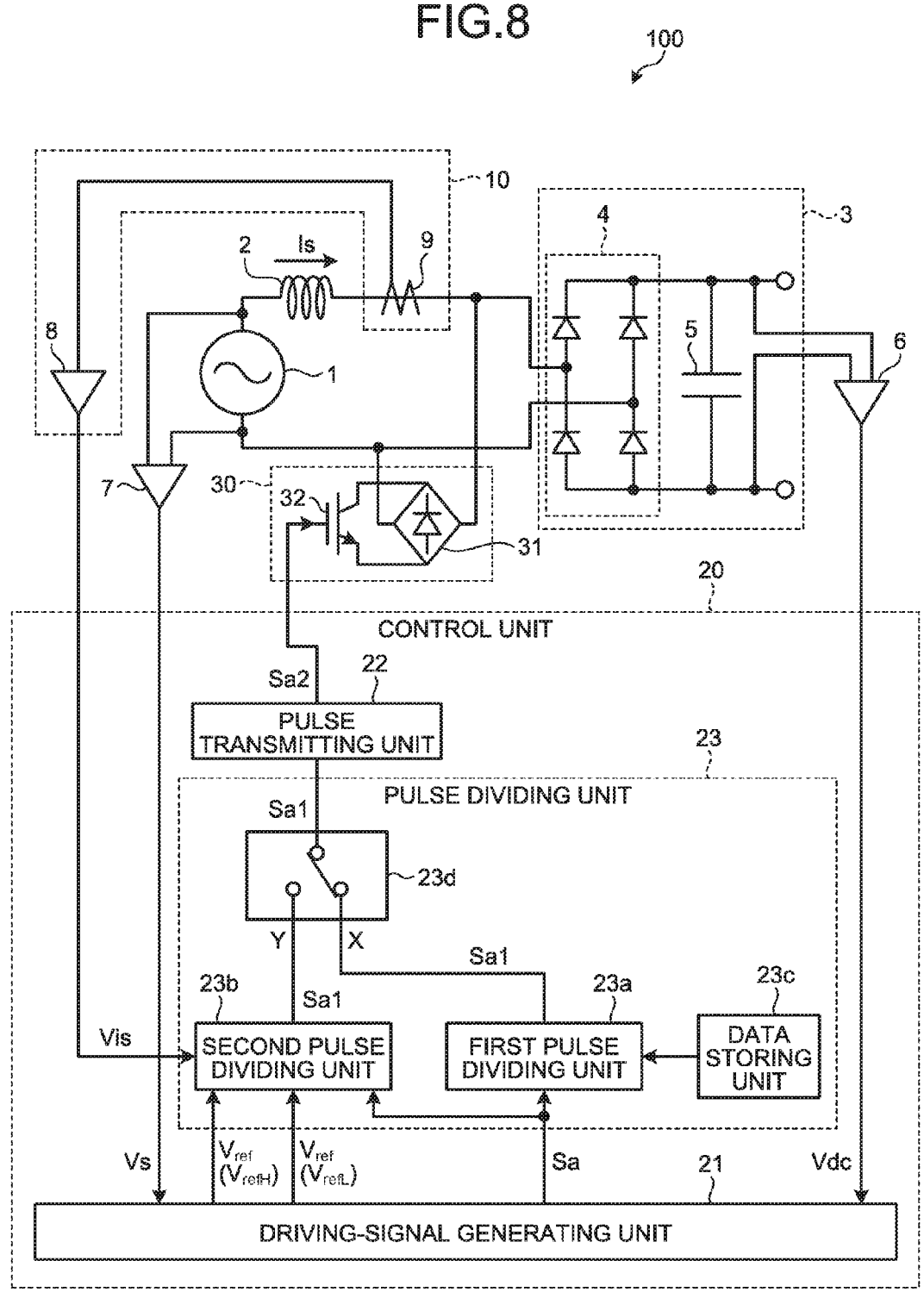
FIG. 8 is a diagram showing a configuration example of a power converting apparatus according to a second embodiment of the present invention.

FIG. 8 is a diagram showing a configuration example of the power converting apparatus 100 according to a second embodiment of the present invention. The power converting apparatus 100 in the second embodiment includes, in addition to the components in the first embodiment, current detecting means 10 including a current detecting element 9 that is connected between the reactor 2 and the rectifier 3 and detects a current value in a connecting position and a current detecting unit 8 that converts a voltage corresponding to the electric current detected by the current detecting element 9 into a current detection voltage Vis within a low voltage range that the control unit 20 can handle and outputs the current detection voltage Vis, the current detecting means 10 detecting the power supply current Is of the alternating-current power supply 1. The current detecting unit 8 is realized by an amplifier or a level shift circuit. As the current detecting element 9, as an example, a current transformer or a shunt resistor is used.

The control unit 20 in the second embodiment includes the driving-signal generating unit 21 that generates the driving signal Sa, which is a switching pulse for controlling the short-circuit element 32 of the short-circuit unit 30 on the basis of the direct-current voltage Vdc and the power supply voltage Vs, and a reference voltage $V_{ref}$, a pulse dividing unit 23 that divides the driving signal Sa from the driving-signal generating unit 21 into a plurality of pulses and outputs driving signals Sa1, which are a plurality of pulses after the division, to a pulse transmitting unit 22, and the pulse transmitting unit 22 that converts the driving signals Sa1 from the pulse dividing unit 23 into a driving signal Sa2 and transmits the driving signal Sa2 to the short-circuit unit 30.

The reference voltage $V_{ref}$ is a hysteresis reference voltage, which is a threshold for limiting a value of the power supply current Is. As the reference voltage $V_{ref}$, there are a positive electrode side reference voltage $V_{refH}$ and a negative electrode side reference voltage $V_{refL}$. A circuit that generates the reference voltage $V_{ref}$ is explained below.

The pulse dividing unit 23 includes a first pulse dividing unit 23a that divides the driving signal Sa into the driving signals Sa1, which are a plurality of pulses, according to software processing, a second pulse dividing unit 23b that divides the driving signal Sa into a plurality of driving signals Sa1 according to hardware processing, a data storing unit 23c that stores data necessary for calculation in the first pulse dividing unit 23a, and a selector 23d, which is a selecting unit that selects the driving signal Sa1 from the first pulse dividing unit 23a or the driving signal Sa1 from the second pulse dividing unit 23b and outputs the driving signal Sa1 to the pulse transmitting unit 22.

There are two terminals on an input side of the selector 23d. When an internal contact is connected to an X-side terminal, the driving signal Sa1 generated by the first pulse dividing unit 23a is output to the pulse transmitting unit 22. When the internal contact is connected to a Y-side terminal, the driving signal Sa1 generated by the second pulse dividing unit 23b is output to the pulse transmitting unit 22.

The pulse transmitting unit 22 is configured by a level shift circuit. The pulse transmitting unit 22 performs a voltage level shift such that gate driving can be performed, converts the driving signal Sa1 from the pulse dividing unit 23 into the driving signal Sa2, which is a gate driving signal, and outputs the driving signal Sa2 to the short-circuit unit 30.

Figure 9:
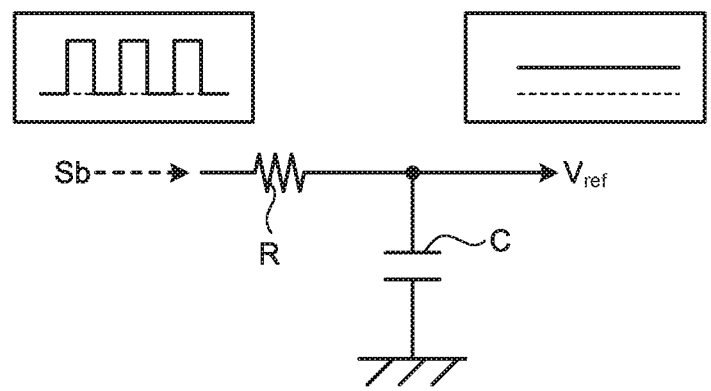
FIG. 9 is a first configuration diagram of a reference-voltage generation circuit for pulse control.
Figure 10:
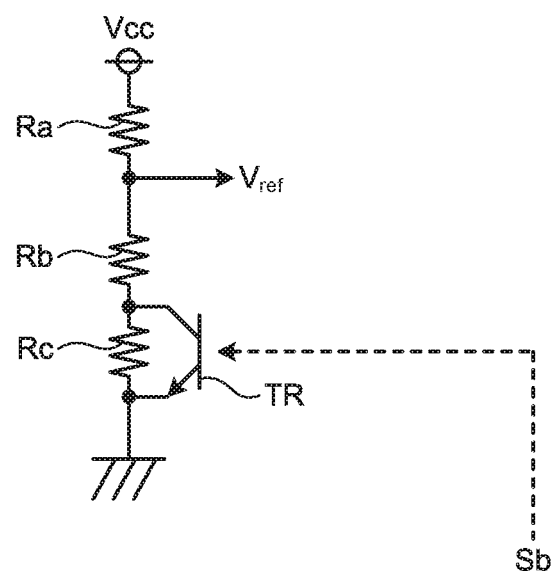
FIG. 10 is a second configuration diagram of the reference-voltage generation circuit for pulse control.

FIG. 9 is a first configuration diagram of a reference-voltage generation circuit for pulse control. FIG. 10 is a second configuration diagram of the reference-voltage generation circuit for pulse control. The circuit shown in FIG. 9 converts a pulse width modulation signal, which is a port output Sb of the driving-signal generating unit 21, into a direct current value with a low-pass filter to generate the reference voltage $V_{ref}$. In this case, it is possible to seamlessly change a value of reference voltage $V_{ref}$ by controlling a duty ratio of the pulse width modulation signal. The circuit shown in FIG. 10 changes the value of the reference voltage $V_{ref}$ stepwise at a voltage division ratio of resistors Rb and Rc by driving a switch TR with the port output Sb of the driving-signal generating unit 21. Note that a circuit that generates the reference voltage $V_{ref}$ is not limited to the circuits shown in FIGS. 9 and 10. The reference voltage $V_{ref}$ can be generated by a known circuit other than the circuits shown in FIGS. 9 and 10. The reference voltage $V_{ref}$ generated on the outside of the control unit 20 can be used.

The configuration and the operation of the second pulse dividing unit 23b are explained.

Figure 11:
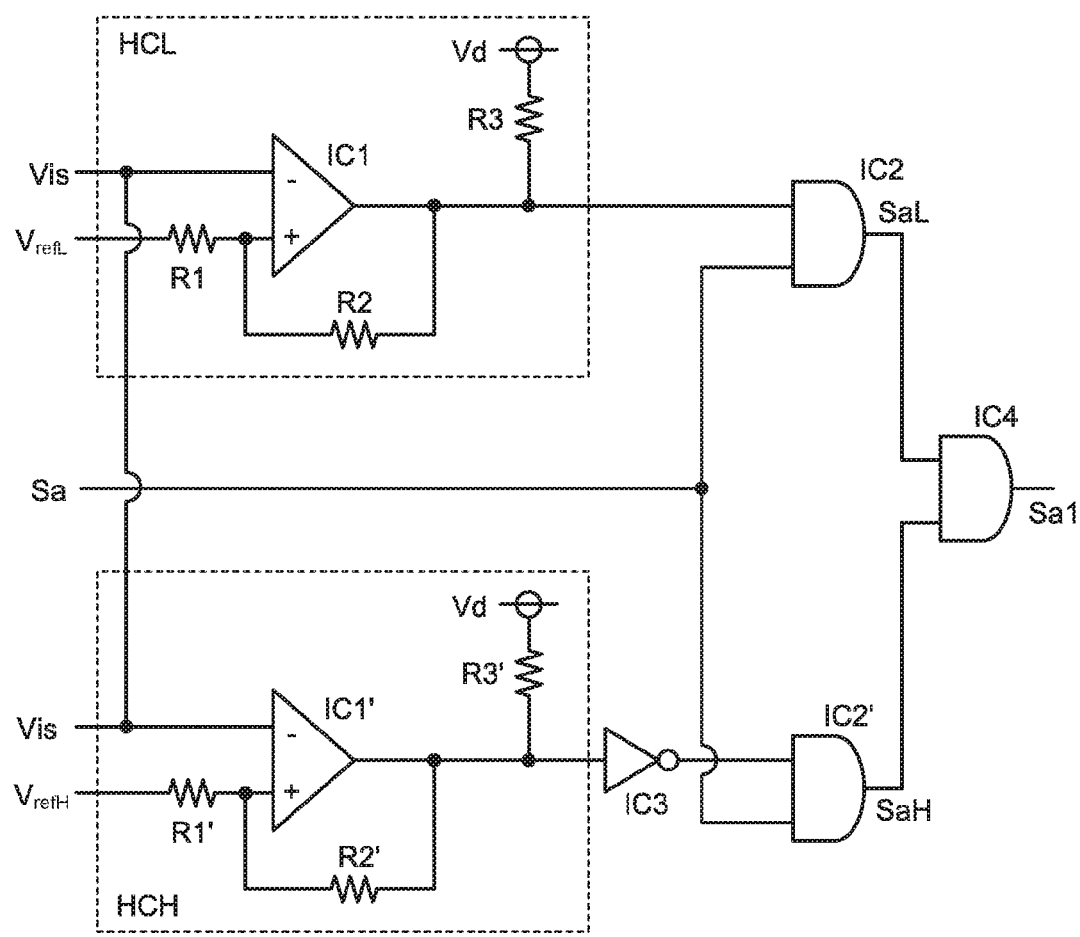
FIG. 11 is a diagram showing a configuration example of a second pulse dividing unit.

FIG. 11 is a diagram showing a configuration example of the second pulse dividing unit 23b. The second pulse dividing unit 23b includes a positive-side hysteresis comparator HCH that determines hysteresis corresponding to a current control range on the positive electrode side according to a relation among a positive electrode side upper limit threshold calculated by Expression (1), a positive electrode side lower limit threshold calculated by Expression (2), and a positive electrode side reference voltage $V_{refH}$ and controls a waveform of the current detection voltage Vis and a negative-electrode side hysteresis comparator HCL that determines hysteresis corresponding to a current control range on the negative electrode side according to a relation among a negative electrode side upper limit threshold calculated by Expression (1), a negative electrode side lower limit threshold calculated by Expression (2), and the negative electrode side reference voltage $V_{refL}$ and controls a waveform of the current detection voltage Vis. The second pulse dividing unit 23b includes a NOT logic IC 3 that inverts an output of the positive electrode side hysteresis comparator HCH, an AND logic circuit IC 2' that calculates AND of an output of the NOT logic IC 3 and the driving signal Sa and outputs a positive electrode side driving signal SaH, an AND logic IC 2 that calculates AND of an output of the negative electrode side hysteresis comparator HCL and the driving signal Sa and outputs a negative electrode side driving signal SaL, and an AND logic IC 4 that calculates an AND logic of the positive electrode side driving signal SaH and the negative electrode side driving signal SaL and outputs the driving signal Sa1, which is a result of the AND logic. The current control range is a target control range of the power supply current Is of the alternating-current power supply 1. The upper limit threshold is a threshold for restricting an upper limit of a short-circuit current flowing when the short-circuit unit 30 is turned on. The lower limit threshold is a threshold set to a value smaller than the upper limit threshold. Note that $V_d$ of Expression (1) represents a low-pressure system power supply. VOL of Expression (2) represents an output saturation voltage of an operational amplifier.

[Math 1]

$$V_{THH}(H) = V_{refH} + \frac{R_1}{R_1 + R_2 + R_3}(V_d - V_{refH}) \quad (1)$$

[Math 2]

$$V_{THH}(L) = V_{refH} + \frac{R_1}{R_1 + R_2 + R_3}(V_{refH} - V_{OL}) \quad (2)$$

The current detecting unit 8 shown in FIG. 8 includes a level shift circuit and an amplifier provided at a post stage of the current detecting element 9 and converts, with a half value of the low voltage system power supply Vd shown in FIG. 11 set as a value equivalent to 0 ampere, a current waveform of an alternating current detected by the current detecting element 9 into a current waveform of only a positive electrode side and outputs the current waveform. Consequently, in the second pulse dividing unit 23b, it is possible to generate the driving signal Sa1 irrespective of a current polarity.

By using the second pulse dividing unit 23b configured by a plurality of hysteresis comparators, it is possible to generate the driving signal Sa1 irrespective of a current characteristic. By controlling the waveform of the power supply current Is, that is, the current detection voltage Vis with the driving signal Sa1, it is possible to raise the direct-current voltage Vdc while suppressing a peak value of a short-circuit current flowing when the short-circuit unit 30 is turned on.

The hysteresis comparators can change the width of hysteresis by changing resistance values of resistors R1, R1', R2, R2', R3, and R3'. As an example, the hysteresis comparator can switch a combined resistance value by connecting a series circuit of a switch and a resistor in parallel to the resistor R2 or the resistor R2' and opening and closing the switch. A computation load in the control unit 20 is reduced by performing, in the hysteresis comparators, a part of processing in the control unit 20. It is possible to manufacture the power converting apparatus 100 with an inexpensive central processing unit.

Figure 12:
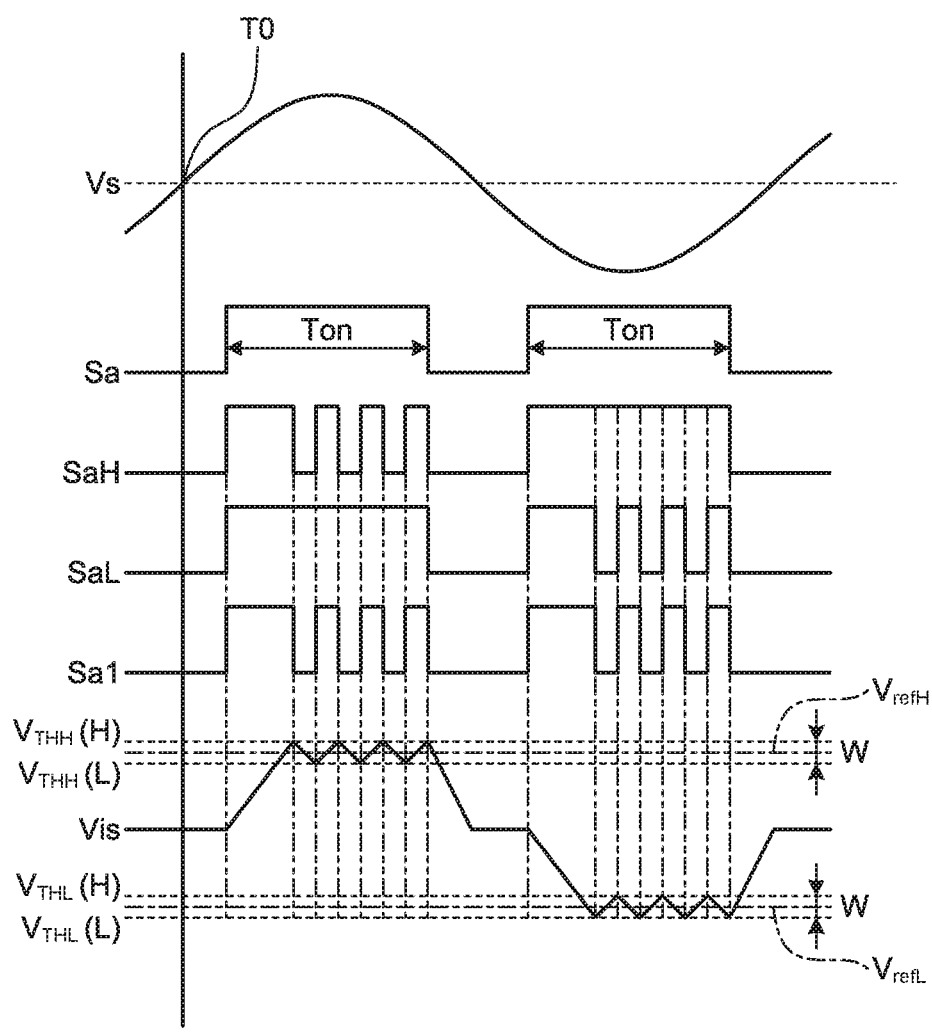
FIG. 12 is a diagram showing a waveform of a power supply current at the time when a driving signal is divided into a plurality of pulses in a positive electrode side half cycle and a negative electrode side half cycle.

FIG. 12 is a diagram showing a waveform of a power supply current at the time when the driving signal Sa is divided into a plurality of pulses in the positive electrode side half cycle and the negative electrode side half cycle. In FIG. 12, the driving signal Sa generated by the driving-signal generating unit 21 is shown. In the second embodiment, in the following explanation, it is assumed that the driving signal Sa is generated once during the power supply half cycle. A period until the driving signal Sa is turned off after being turned on is represented as the ON time Ton.

In FIG. 12, a positive electrode side driving signal SaH, a negative electrode side driving signal SaL, a positive electrode side upper limit threshold $V_{THH}(H)$, a positive electrode side lower limit threshold $V_{THH}(L)$, a negative electrode side upper limit threshold $V_{THL}(H)$, and a negative electrode side lower limit threshold $V_{THL}(L)$ at the time when the second pulse dividing unit 23b performs dividing operation are shown.

Pulse dividing operation is performed on the positive electrode side and the negative electrode side of the alternating-current power supply 1, whereby a peak value of the power supply current Is on the positive electrode side is kept within a current control range W having the positive electrode side reference voltage $V_{refH}$ as a center value and a peak value of the power supply current Is on the negative electrode side is kept within a current control range W having the negative electrode side reference voltage $V_{refL}$ as a center value.

Note that, when a switching frequency is relatively high, an increase in a loss, radiation noise, and a noise terminal voltage due to the switching sometimes pose problems. When solution of such problems is attempted, the number of times of switching of the driving signal Sa1 is reduced by widening the current control range W with the reference voltage $V_{ref}$ set as a center value. Therefore, the switching frequency is reduced. It is possible to suppress the increase in the loss, the radiation noise, and the noise terminal voltage.

On the other hand, when the switching frequency is relatively low, noise in an audible frequency band sometimes poses a problem. When solution of such a problem is attempted, the number of times of switching of the driving signal Sa1 is increased by narrowing the current control range W with the reference voltage $V_{ref}$ set as the center value. Therefore, the switching frequency is increased. It is possible to suppress the noise.

The configuration of the first pulse dividing unit 23a is explained. When the switching of the short-circuit unit 30 is performed using the first pulse dividing unit 23a, it is necessary to set on and off timings of the short-circuit unit 30. To set the on and off timings, it is necessary to specify a rising time Ta of the driving signal Sa and a falling time Tb of the driving signal Sa.

FIG. 13 is a diagram showing a driving signal for switching the short-circuit unit 30 once during the power supply half cycle. FIG. 14 is a diagram showing a driving signal for switching the short-circuit unit 30 a plurality of times during the power supply half cycle.

Time when the driving signal Sa rises at a point in time when an ON start time elapses from the zero-cross point T0 is represented as T1a and time when the driving signal Sa falls is represented as T1b. As an example, if time from the zero-cross point T0 to T1a and time from the zero-cross point T0 to T1b are stored as data, it is possible to specify the on and off timings of the short-circuit unit 30. By using these time data, in the first pulse dividing unit 23a, it is possible to switch the short-circuit unit 30 once during the power supply half cycle as shown in FIG. 13.

On the other hand, when the short-circuit unit 30 is switched N times during the power supply half cycle as shown in FIG. 14, time when an n-th driving signal Sa rises at the point in time when the ON start time elapses from the zero-cross point t0 is represented as Tna and time when the n-th driving signal Sa falls is represented as Tnb. N is an integer equal to or larger than 2.

In this case, to specify the on and off timings of the short-circuit unit 30, it is necessary to store the number of data proportional to a value of n. Control parameters increase according to an increase of the number of times of switching. Depending on operation conditions such as a direct-current voltage command, the magnitude of a load, and a type of the load, design of the control parameter is complicated. When the number of times of switching increase, a long time is required for reliability verification or evaluation of data.

When the second pulse dividing unit 23b configured by hardware is used, the reliability verification or the evaluation of the data is unnecessary. However, when it is necessary to change a hardware configuration to adopt the second pulse dividing unit 23b to the operation conditions, a configuration change is sometimes difficult because of limitation on dimensions or limitation on cost.

The inventor focused on a tendency of a change with time of ON times and OFF times of the plurality of driving signals Sa1 generated during the power supply half cycle such that the peak value of the power supply current Is is kept within the current control range W. The inventor derived the power converting apparatus 100 having high reliability while suppressing an increase of control parameters, reducing time and a load required for reliability verification or evaluation, and achieving high efficiency without causing a large increase in cost.

Figure 15:
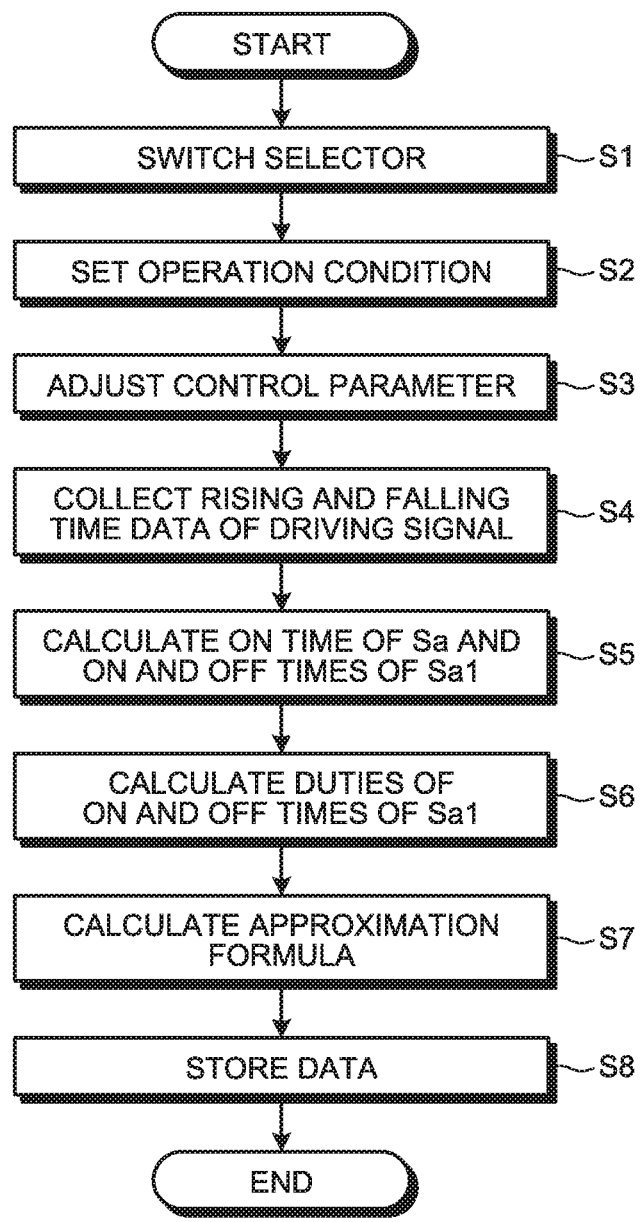
FIG. 15 is a flowchart showing a procedure for creating data used in a first pulse dividing unit.

FIG. 15 is a flowchart showing a procedure for creating data used in the first pulse dividing unit 23a. An example is explained in which data stored in the data storing unit 23c is calculated using the plurality of driving signals Sa1 generated by the second pulse dividing unit 23b shown in FIG. 8.

(Step S1)

The internal contact of the selector 23d shown in FIG. 8 is switched to a Y-side input terminal. Consequently, it is possible to automatically obtain the driving signals Sa1 using the driving signal Sa generated by the driving-signal generating unit 21.

(Step S2)

Operation conditions are set in the driving-signal generating unit 21.

(Step S3)

A current limitation level and the current control range W of the power supply current Is are adjusted. The current limitation level are decided by the positive electrode side reference voltage $V_{refH}$ and the negative electrode side reference voltage $V_{refL}$. The current control range W is decided by resistance values of the resistors R1, R1', R2, R2', R3, and R3' shown in FIG. 11. The current limitation level and the current control range W are adjusted using these limited parameters such that desired boosting performance, a power supply power factor, or harmonic current can be obtained.

(Step S4)

A rising time and a falling time of the driving signal Sa generated by the driving-signal generating unit 21 are collected according to the operation conditions set at step S2 and the parameters adjusted at step S3. Rising times and falling times of the plurality of driving signals Sa1 generated by the second pulse dividing unit 23b are collected using the parameters adjusted at step S3. Data collection is performed by an analysis or an actual machine.

(Step S5) The ON time Ton of the driving signal Sa, the ON times Ton of the driving signals Sa1, and OFF times Toff of the driving signals Sa1 are measured using the data collected at step S4.

Figure 16:
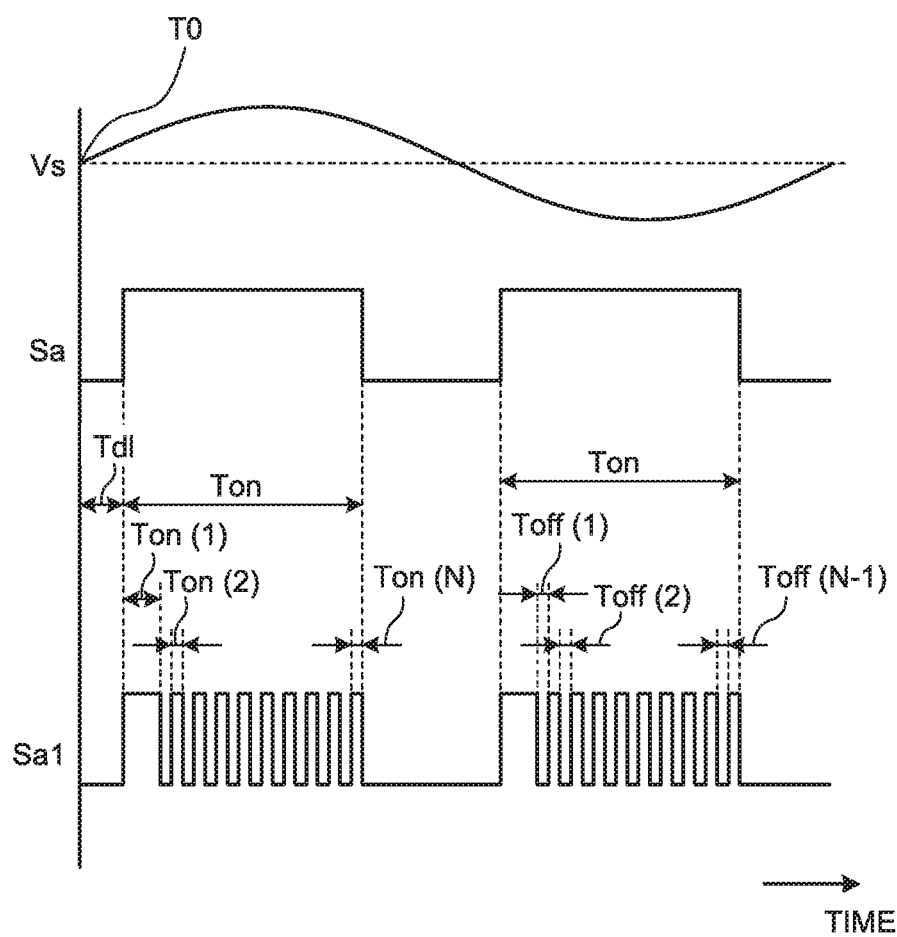
FIG. 16 is a diagram showing an ON time of a driving signal generated by a driving-signal generating unit, an ON time of a driving signal generated by a pulse dividing unit, and an OFF time of the driving signal generated by the pulse dividing unit.

FIG. 16 is a diagram showing the ON time Ton of the driving signal Sa generated by the driving-signal generating unit 21, the ON time Ton of the driving signal Sa1 generated by the pulse dividing unit 23, and the OFF times Toff of the driving signals Sa1 generated by the pulse dividing unit 23.

In FIG. 16, the driving signal Sa generated once in each of the positive electrode side half cycle and the negative electrode side half cycle of the power supply voltage Vs and N driving signals Sa1 generated during the ON time Ton of the driving signal Sa are shown. N is an integer equal to or larger than 2.

Both of the driving signal Sa and a first driving signal Sa1 are turned on at a point in time when the ON start time Td1 elapses from the zero-cross point T0 in a rise of the power supply voltage Vs. Ton(1) represents an ON time of the first driving signal Sa1 generated within the positive electrode side half cycle, that is, time until the first driving signal Sa1 falls from a point in time when the first driving signal Sa1 rises. Ton(2) represents an ON time of a second driving signal Sa1 generated within the positive electrode side half cycle. Ton(N) represents an ON time of an N-th driving signal Sa1 generated within the positive electrode side half cycle.

Similarly, at a point in time when the ON start time elapses from the zero-cross point in a fall of the power supply voltage Vs, both of the driving signal Sa and the first driving signal Sa1 are turned on. Toff(1) represents an OFF time between the first driving signal Sa1 and the second driving signal Sa1 generated within the negative electrode side half cycle, that is, time until the second driving signal Sa1 rises from a point in time when the first driving signal Sa1 falls. Toff(2) represents an OFF time between the second driving signal Sa1 and a third driving signal Sa1 generated within the negative electrode side period. Toff(N−1) represents an OFF time between an N−1-th driving signal Sa1 and an N-th driving signal Sa1 generated within the negative electrode side half cycle.

The ON time Ton of the driving signal Sa, the ON times Ton of the driving signals Sa1, and the OFF times Toff of the driving signals Sa1 are calculated according to the rising time and the falling time of the driving signal Sa and the rising times and the falling times of the respective first to N-th driving signals Sa1 collected at step S4. Further, pulse numbers of the driving signals Sa1 and inter-pulse numbers among the driving signals Sa1 adjacent to one another are calculated according to the order of the collected driving signals Sa1.

(Step S6)

On-duties of the ON times Ton of the driving signals Sa1 with respect to the ON time Ton of the driving signal Sa and off-duties of the OFF times Toff of the driving signals Sa1 with respect to the ON time Ton of the driving signal Sa are calculated using the ON and OFF times of the driving signals Sa1 obtained at step S5.

When focusing on the tendency of the change with time of the ON times and the OFF times of the plurality of driving signals Sa1 generated during the power supply half cycle as explained above, it is possible to find regularity in the on-duties and the off-duties. This is specifically explained below.

Functions described below are defined in calculating the on-duties and the off-duties.

[Math 3]

$$\text{on\_duty}(x) = \frac{T_{on}(x)}{T_{on}} \{1 \le x \le N\} \tag{3}$$

[Math 4]

$$\text{off\_duty}(y) = \frac{T_{off}(y)}{T_{on}} \{1 \le y \le (N-1)\} \tag{4}$$

Expression (3) is on-duty of an ON time Ton(x) of an x-th driving signal Sa1 during the power supply half cycle with respect to the ON time Ton of the driving signal Sa. N is a total number of the driving signals Sa1 generated during the power supply half cycle.

Expression (4) is off-duty of an OFF time Toff(y) between the x-th driving signal Sa1 and an x−1-th driving signal Sa1 during the power supply half cycle with respect to the ON time Ton of the driving signal Sa. N is a total number of the driving signals Sa1 generated during the power supply half cycle.

Figure 17:
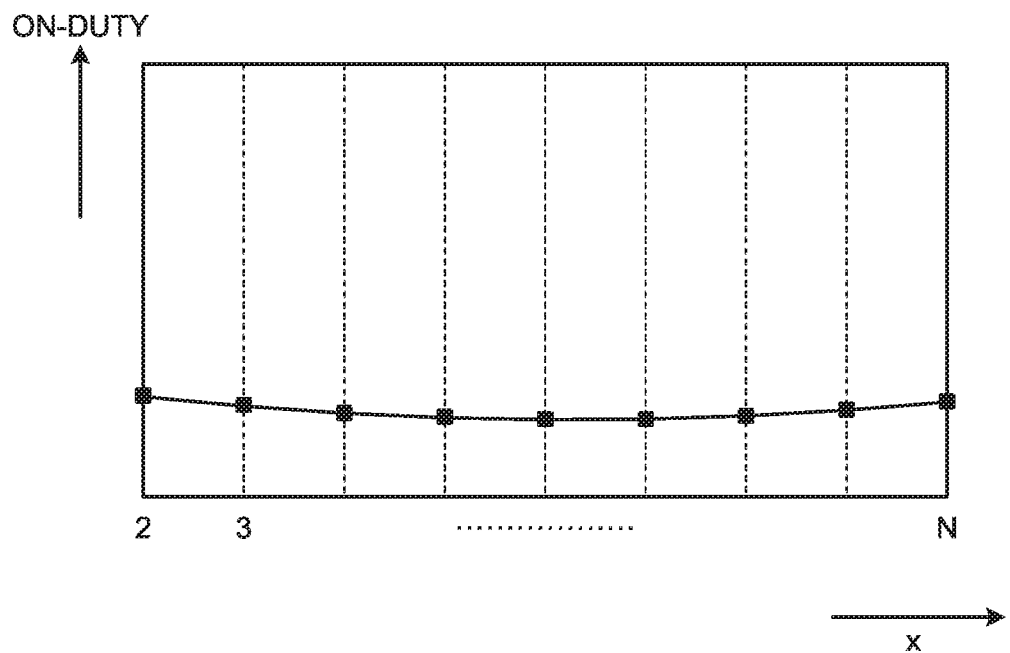
FIG. 17 is a diagram representing a change with time of on-duties of N driving signals generated during the power supply half cycle.

FIG. 17 is a diagram representing a change with time of on-duties of the N driving signals Sa1 generated during the power supply half cycle. The horizontal axis represents pulse numbers x, which are numbers of the second to N-th driving signals Sa1 among the N driving signals Sa1 generated during the power supply half cycle. The vertical axis represents on-duties with respect to second to N-th driving signals Sa1n calculated by Expression (3).

When focusing on pulse trains of the second to N-th driving signals Sa1, it is seen that on-duty at the time when the peak value of the power supply current Is is kept within the current control range W as shown in FIG. 12 has a characteristic indicating a gradient that draws a parabola convex downward and is relatively gentle.

Figure 18:
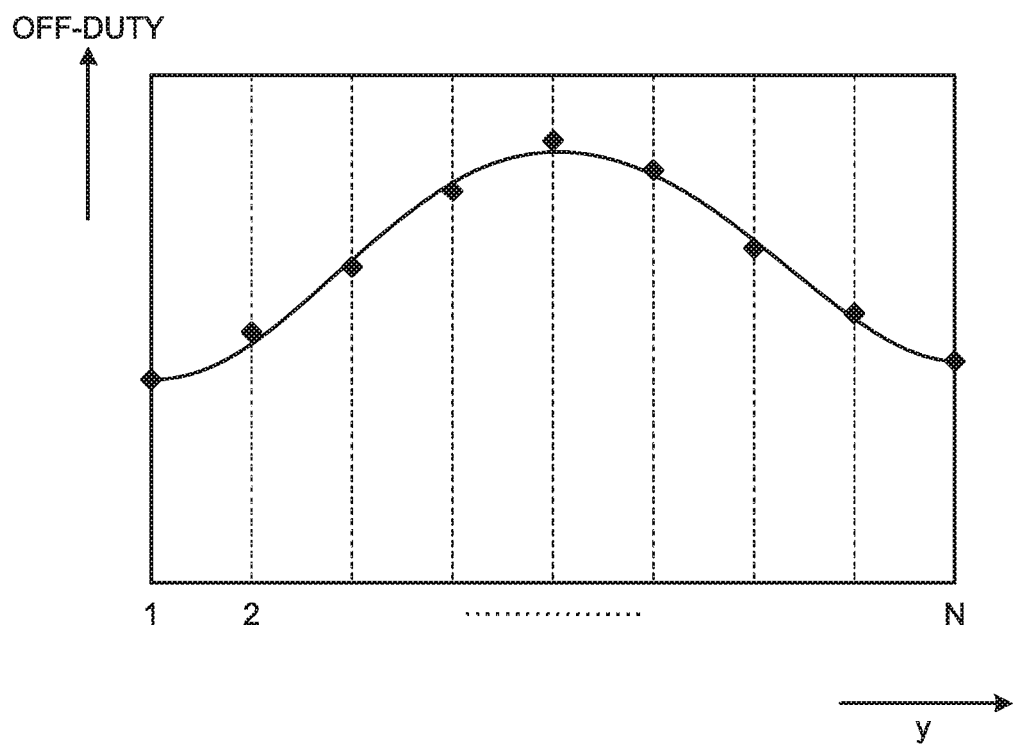
FIG. 18 is a diagram representing a change with time of off-duties of the N driving signals generated during the power supply half cycle.

FIG. 18 is a diagram representing a change with time of off-duties of the N driving signals Sa1 generated during the power supply half cycle. The horizontal axis represents inter-pulse numbers y, which are numbers among the driving signals Sa1 generated during the power supply half cycle. The vertical axis represents values of off-duties with respect to the first to N-th driving signals Sa1n calculated by Expression (4).

When focusing on the pulse trains of the second to N-th driving signals Sa1, it is seen that off-duty at the time when the peak value of the power supply current Is is kept within the current control range W as shown in FIG. 12 has a characteristic indicating a gradient that draws a parabola convex upward and is steeper than the on-duty.

(Step S7)

The on-duties and the off-duties of the plurality of driving signals Sa1 generated during the power supply half cycle in this way change with time. The tendencies of the changes of the on-duties and the off-duties are different. The inventor devised a method of representing, with an approximation formula, on-duties and off-duties of the driving signals Sa1 in a specific region among the plurality of driving signals Sa1 generated in the power supply half cycle.

On-duty has a characteristic indicating a relatively gentle gradient. Therefore, the on-duty of Expression (3) can be approximated by a quadratic equation shown in Expression (5). A1, B1, and C1 indicate constants of the approximation formula.

[Math 5]

$$\text{on\_duty}(x) = A_1 \cdot x^2 + B_1 \cdot x + C_1 \ \{1 \le x \le N\} \tag{5}$$

The off-duty of Expression (4) can also be approximated by a quadratic equation. However, off-duty has a characteristic indicating a relatively steep gradient compared with the on-duty. In the second embodiment, the off-duty is approximated by a quartic equation as indicated by Expression (6). A2, B2, C2, D2, and E2 indicate constants of the approximation formula.

[Math 6]

$$\text{off\_duty}(y) = A_2 \cdot y^4 + B_2 \cdot y^3 + C_2 \cdot y^2 + D_2 \cdot y + E_2 \ \{1 \le y \le (N-1)\} \quad (6)$$

Note that on-duty of the first driving signal Sa1, which is a pulse outside the specific region, can be represented by Expression (7). N is a total number of the driving signals Sa1 generated during the power supply half cycle. In this way, concerning the ON time of the first driving signal Sa1, an error of the approximation formula can also be absorbed by using Expression (7) without performing setting of on-duty.

[Math 7]

$$\text{on\_duty}(1) = 1 - \sum_{k=2}^{N} \text{on\_duty}(k) - \sum_{k=1}^{N-1} \text{off\_duty}(k) \quad (7)$$

In this way, the approximation formula of the on-duties of the driving signals Sa1 in the specific region among the plurality of driving signals Sa1 generated during the power supply half cycle, the approximation formula of the off-duties of the plurality of driving signals Sa1 generated during the power supply half cycle, and the on-duties of the driving signals Sa1 outside the specific region are calculated.

(Step S8)

The on-duties and the pulse numbers calculated at step S7 are converted into functions in association with each other, the off-duties and the inter-pulse numbers calculated at step S7 are converted into functions in association with each other, and the data converted into the functions and the constant data of the approximation formula are stored in the data storing unit 23c.

The first pulse dividing unit 23a measures the ON time Ton of the driving signal Sa from the driving-signal generating unit 21 and multiplies the on-duties and the off-duties read out from the data storing unit 23c with the ON time Ton of the driving signal Sa to set ON and OFF times of the first to N-th driving signals Sa1 during the power supply half cycle.

The number of times of switching changed according to a load condition is explained. When a load transitions from a light load to a heavy load, if it is necessary to increase the number of times of switching, to realize boosting while achieving suppression of a current peak, improvement of a power factor, and suppression of harmonics, it is necessary to increase the ON time Ton of the driving signal Sa input to the first pulse dividing unit 23a and the second pulse dividing unit 23b.

Specifically, this can be realized by multiplying the ON time Ton of the driving signal Sa with a correction coefficient Kc as indicated by Expression (8). Kc is an integer equal to or larger than 1 and only has to be set according to a switching condition of the number of times of switching. It is possible to suppress fluctuation in the direct-current voltage Vdc and obtain the stable direct-current voltage Vdc by multiplying the ON time Ton with the correction coefficient Kc during the switching of the number of times of switching.

[Math 8]

$$Ton = Ton \cdot Kc \quad (8)$$

Figure 19:
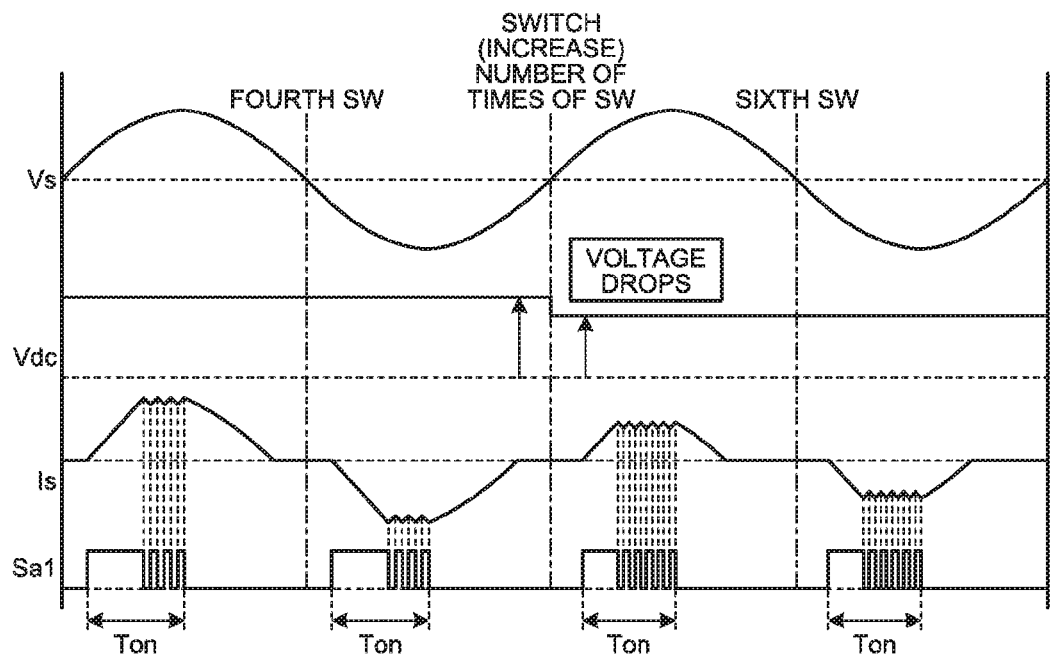
FIG. 19 is a first diagram showing fluctuation in a direct-current voltage detected when the number of times of switching during the power supply half cycle increase from four to six.

FIG. 19 is a first diagram showing fluctuation in the direct-current voltage Vdc detected when the number of times of switching during the power supply half period increases from four to six. In FIG. 19, a waveform of the driving signals Sa1 is shown instead of the driving signal Sa shown in FIG. 4.

The numbers of times of switching in the positive electrode side half cycle and the negative electrode side half cycle of the first cycle of the power supply voltage are respectively four. In the second embodiment, it is assumed that the driving signal Sa is generated once in the power supply half cycle. A period until the driving signal Sa is turned off after being turned on is defined as the ON time Ton. Ton in the first cycle of the power supply voltage Vs shown in FIG. 19 is equal to a period until a fourth driving signal Sa1 is turned off after the first driving signal Sa1 generated in the positive electrode side half cycle or the negative electrode side half cycle of the first cycle of the power supply voltage Vs is turned on.

The numbers of times of switching in the positive electrode half cycle and the negative electrode side half cycle of the second cycle of the power supply voltage are respectively six. Ton in the second cycle of the power supply voltage Vs shown in FIG. 19 is equal to a period until a sixth driving signal Sa1 is turned off after the first driving signal Sa1 generated in the positive electrode side half cycle or the negative electrode side half cycle of the second cycle of the power supply voltage Vs is turned on.

In an operation example shown in FIG. 19, it is assumed that the ON time Ton of the first cycle and the ON time Ton of the second cycle are equal. In this case, a sum of the respective ON times of the six driving signals Sa1 in the ON time Ton of the second cycle is relatively smaller than a sum of the respective ON times of the four driving signals Sa1 in the ON time Ton of the first cycle. As a result, when the number of times of switching is switched, the direct-current voltage Vdc drops.

Figure 20:
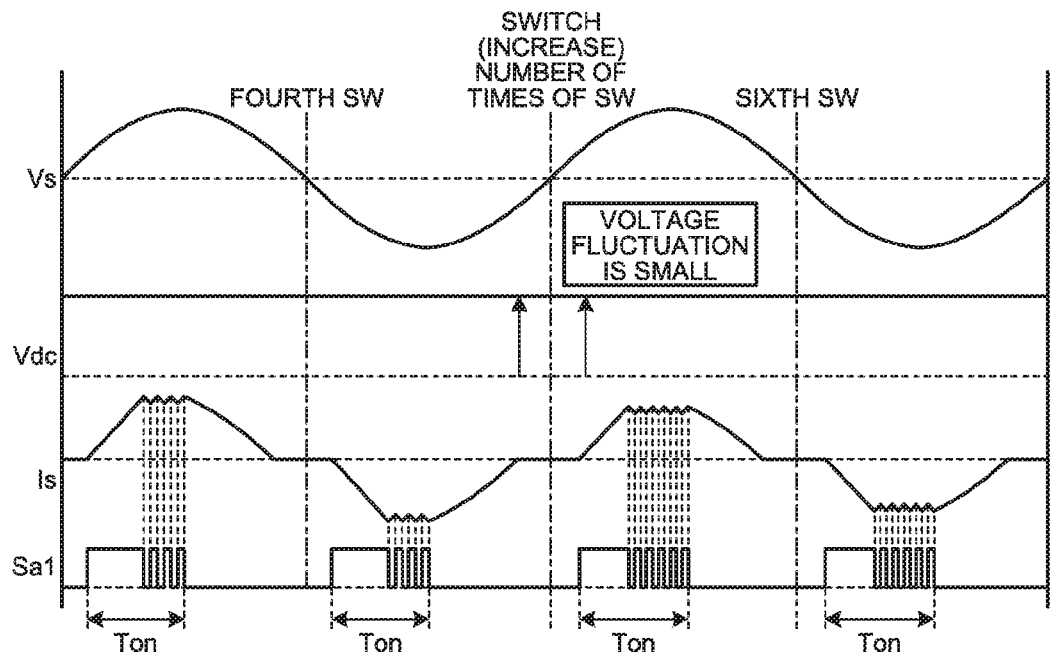
FIG. 20 is a second diagram showing the fluctuation in the direct-current voltage detected when the number of times of switching during the power supply half cycle increase from four to six.

FIG. 20 is a second diagram showing the fluctuation in the direct-current voltage Vdc detected when the number of times of switching during the power supply half cycle increases from four to six. In FIG. 20, fluctuation in the direct-current voltage Vdc before and after the increase of the number of times of switching is small and is an equal value. The fluctuation in the direct-current voltage Vdc is small because, by setting the ON time Ton of the second cycle larger than the ON time Ton of the first cycle, the sum of the respective ON times of the six driving signals Sa1 in the ON time Ton of the second cycle is equal to the sum of the respective ON times of the four driving signals Sa1 in the ON time Ton of the first cycle.

In FIGS. 19 and 20, the example is explained in which the number of times of switching is increased from four to six. However, the number of times of switching is not limited to this.

When a load transitions from a heavy load to a light load, if it is necessary to reduce the number of times of switching, to realize boosting while achieving suppression of a current peak, improvement of a power factor, and suppression of harmonics, it is necessary to reduce the ON time Ton of the driving signal Sa input to the first pulse dividing unit 23a and the second pulse dividing unit 23b.

Specifically, this can be realized by multiplying the ON time Ton of the driving signal Sa with the inverse of the correction coefficient Kc as indicated by Expression (9). Kc is an integer equal to or larger than 1 and only has to be set according to a switching condition of the number of times of switching. It is possible to suppress fluctuation in the direct-current voltage Vdc and obtain the stable direct-current voltage Vdc by multiplying the ON time Ton with the inverse of the correction coefficient Kc during the switching of the number of times of switching.

[Math 9]

$$Ton = Ton \cdot \frac{1}{Kc} \quad (9)$$

Consequently, on and off timings of the short-circuit unit 30 according to the second embodiment is uniquely decided. It is possible to divide the driving signal Sa into the plurality of driving signals Sa1 at the one and off timings.

By using the functions representing the pulse train arrangement as the duties in this way, it is possible to specify the on and off timings of the short-circuit unit 30 without causing an increase of control parameters stored in the data storing unit 23c even if the number of times of switching increases.

Note that, in the second embodiment, the power supply voltage Vs, the power supply current Is, and the direct-current voltage Vdc for generating the driving signal Sa1 are detected. However, when the first pulse dividing unit 23a is operated with the data stored in the data storing unit 23c, the detection of the power supply current Is is not always necessary. The necessity of the power supply current detection only has to be selected according to system specifications to be constructed.

In the second embodiment, the example is explained in which the duties are converted into functions. However, data obtained by converting the ON time and the OFF time into functions or data obtained by representing the ON time and the OFF time as an approximation formula of a second order or more can be stored in the data storing unit 23c and used for the pulse dividing operation.

In the second embodiment, the example is explained in which the pulse is generated using the approximation formula. However, when the number of the driving signals Sa1 generated during the power supply half cycle is relatively small, instead of the approximation formula, the data of the duties calculated at step S6 can be stored or the data of the ON times of the pulses and the data of the OFF times among the pulses calculated at step S5 can be stored. The driving signals Sa1 can be generated using these data. Even with such a configuration, it is possible to perform the pulse division with the first pulse dividing unit 23a. It is possible to suppress an increase in cost involved in the improvement of the control unit 20.

Only one of the first pulse dividing unit 23a and the second pulse dividing unit 23b can be used. The first pulse dividing unit 23a and the second pulse dividing unit 23b can be switched according to an operation condition and used. When it is difficult to change the configuration of the control unit 20 because of limitation on dimensions or limitation on cost, the internal contact of the selector 23d is connected to the X-side terminal and only the first pulse dividing unit 23a is used. When the limitation on cost is not high but it is necessary to improve accuracy of waveform generation of the power supply current Is to use the power supply current Is in various specification environments, the internal contact of the selector 23d is connected to the Y-side terminal and only the second pulse dividing unit 23b is used. When it is necessary to output a specific pulse pattern irrespective of a power supply current to take measures against noise under a specific operation condition while improving waveform generation accuracy, the internal contact of the selector 23d is switched to the X-side terminal or the Y-side terminal according to the operation condition to concurrently use the first pulse dividing unit 23a and the second pulse dividing unit 23b.

In the second embodiment, the example is explained in which the data stored in the data storing unit 23c is calculated using the driving signals Sa1 generated by the second pulse dividing unit 23b. However, data stored in the data storing unit 23c is not limited to this. In a prior analysis, a function obtained by associating the on-duties and the pulse numbers of the driving signals Sa1 and a function obtained by associating the off-duties and the inter-pulse numbers of the driving signals Sa1 can be calculated on the basis of the ON and OFF times of the driving signals Sa1 in which the peak value of the power supply current Is is kept within the current control range W within the ON time Ton of the driving signal Sa. These data converted into the functions and the constant data of the approximation formula can be stored in the data storing unit 23c.

The first pulse dividing unit 23a can be configured as explained below.

Figure 21:
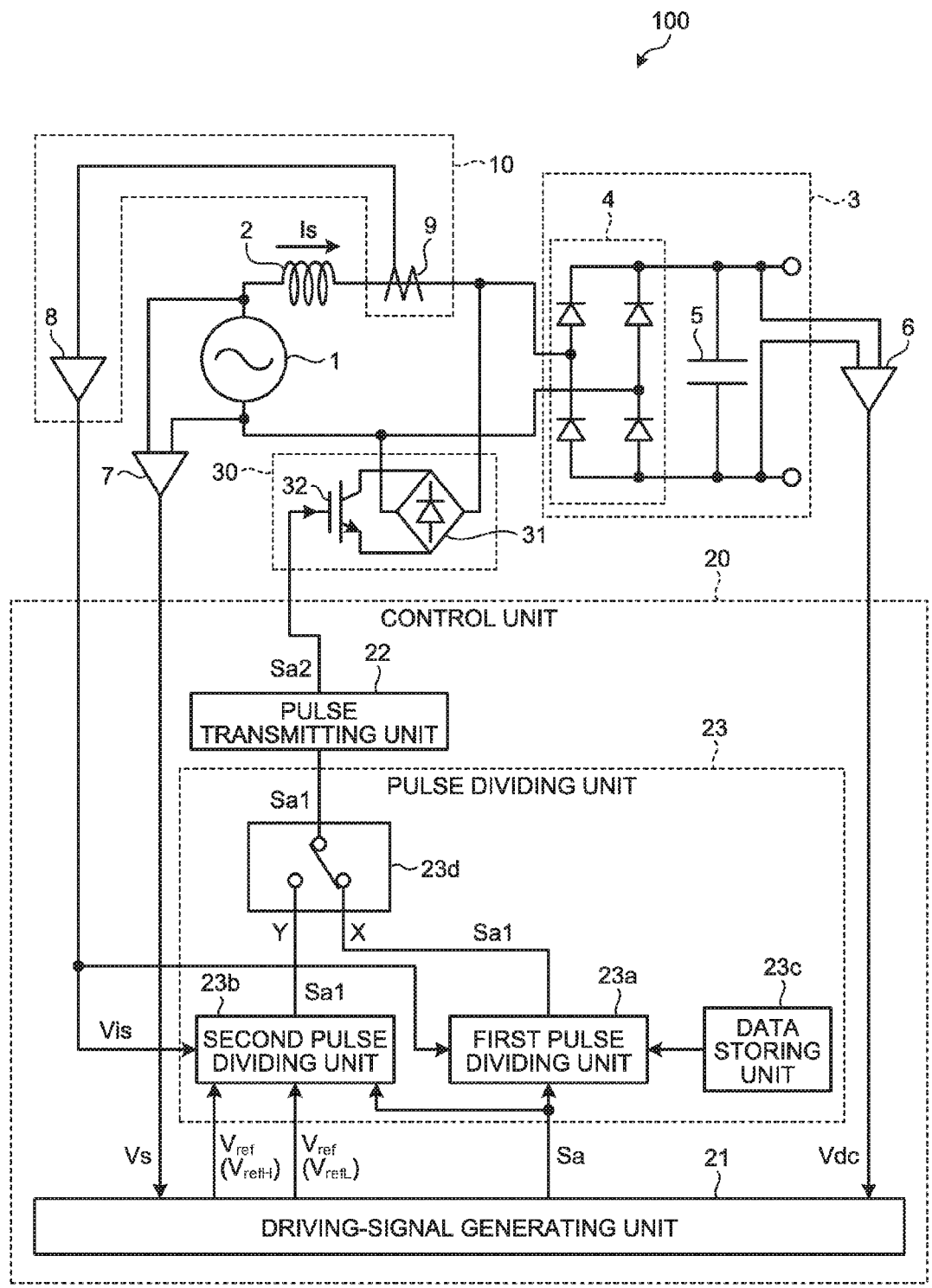
FIG. 21 is a diagram showing a modification of the power converting apparatus according to the second embodiment of the present invention.

FIG. 21 is a diagram showing a modification of the power converting apparatus 100 according to the second embodiment of the present invention. To simplify explanation, it is assumed that the data stored in the data storing unit 23c is the ON time and the OFF time and the on-duty and the off-duty. In the power converting apparatus 100 shown in FIG. 21, the current detection voltage Vis detected by the current detecting means 10 is input to the first pulse dividing unit 23a. The first pulse dividing unit 23a calculates, on the basis of the current detection voltage Vis, a correction coefficient for correcting the on-duty and the off-duty and calculates a correction coefficient for correcting the ON time and the OFF time. The first pulse dividing unit 23a multiplies the on-duty and the off-duty read out from the data storing unit 23c with the correction coefficient or multiplies the ON time and the OFF time read out from the data storing unit 23c with the correction coefficient. The first pulse dividing unit 23a multiplies the on-duty and the off-duty after the correction with the ON time of the driving signal Sa. With this configuration, it is possible to improve accuracy of the ON and OFF times of the driving signals Sa1.

Note that, in the first and second embodiments, the reactor 2 is inserted between the alternating-current power supply 1 and the rectifier circuit 4. The rectifier circuit 4 is connected to the alternating-current power supply 1 via the reactor 2. However, the power converting apparatus 100 only has to be capable of performing short-circuit and open-circuit of the power supply via the reactor 2. Therefore, a positional relation among the rectifier circuit 4, the reactor 2, and the short-circuit unit 30 is not limited to the configuration of the example shown in the figure. That is, the power converting apparatus 100 only has to have a configuration in which the power supply current Is flows in the order of the alternating-current power supply 1, the reactor 2, the short-circuit unit 30, and the alternating-current power supply 1 during short-circuit. As an example, the power converting apparatus 100 can have a configuration in which the rectifier circuit 4 is inserted between the alternating-current power supply 1 and the reactor 2 and the reactor 2 is connected to the alternating-current power supply 1 via the rectifier circuit 4.

In the first and second embodiments, the operation example is explained in which the power supply current Is having a rectangular wave shape is generated by fixing the value of the reference voltage $V_{ref}$. The power supply current Is having a shape other than the rectangular wave shape can be generated by changing the reference voltage $V_{ref}$ with time.

In the first and second embodiments, the peak value of the power supply current Is is controlled to be kept within the current control range W. However, there is no problem if the peak value of the power supply current Is deviates from the current control range W in a range in which a harmonics generation amount does not pose a problem. Specifically, because a pulse width of one driving signal Sa1 among the plurality of driving signals Sa1 is large, there is no problem even when the peak value of the power supply current Is exceeds a current limitation level.

In the first and second embodiments, the control unit 20 is configured to detect the zero-cross point of the power supply voltage Vs and achieve synchronization with the power supply voltage Vs with the zero-cross point set as the origin. However, the synchronization with the power supply voltage Vs is not limited to this. As an example, the control unit 20 can configured to detect the peak value of the power supply voltage Vs and achieve the synchronization with the power supply voltage Vs with the peak value set as the origin. The power converting apparatus 100 according to the first and second embodiments synchronizes the number of times of the short-circuit operation of the short-circuit unit 30 with the power supply voltage detected by the power-supply-voltage detecting unit 7 and controls the number of times of the short-circuit operation. However, the power converting apparatus 100 can be configured to synchronize the number of times of the short-circuit operation of the short-circuit unit 30 with a synchronization signal using a synchronization-signal detecting unit, which detects a synchronization signal synchronized with an alternating-current voltage of the alternating-current power supply 1, instead of the power-supply-voltage detecting unit 7 and control the number of times of the short-circuit operation.

As explained above, the power converting apparatus 100 according to the first and second embodiments includes a rectifier 3 that converts the alternating-current power from the alternating-current power supply 1 into direct-current power, the short-circuit unit 30 that short-circuits the alternating-current power supply 1 via the reactor 2, and the control unit 20 that controls the short-circuit operation of the short-circuit unit 30. The control unit 20 changes the number of times of the short-circuit operation during the half cycle of the alternating-current power supply 1 on the basis of a load condition and sets a period from a start to an end of the short-circuit operation during the half cycle of the alternating-current power supply 1 after the change of the number of times of the short-circuit operation to be different from a period from a start to an end of the short-circuit operation during the half cycle of the alternating-current power supply 1 before the change of the number of times of the short-circuit operation. By appropriately controlling the length of the period until the driving signal Sa is turned off after being turned on, even when the number of times of the short-circuit operation of the short-circuit unit 30 is changed according to the load condition, it is possible to suppress fluctuation in the direct-current voltage Vdc. Therefore, it is possible to construct a system having high safety. It is possible to increase a voltage to a voltage higher than the voltage of the conventional converter while improving a power factor and suppressing harmonics. The power converting apparatus 100 in the first and second embodiments is configured to appropriately control, according to the tendency of the change of the number of times of switching, the length of the period until the driving signal Sa is turned off after being turned on. Therefore, control parameters can be reduced in number. Therefore, it is possible to suppress an increase in a load involved in tuning of unnecessary parameters. In the power converting apparatus 100 in the first and second embodiments, it is possible to appropriately control, according to the load condition, the length of the period until the driving signal Sa is turned off after being turned on. Therefore, it is possible to suppress the number of times of switching at the time when the load is relatively low. It is possible to suppress an increase in switching losses.

When the number of times of the short-circuit operation during the half cycle of the alternating-current power supply is increased, the control unit sets the period after the increase of the number of times of the short-circuit operation to be larger than the period before the increase of the number of times of the short-circuit operation. With this configuration, it is possible to suppress the fluctuation in the direct-current voltage Vdc before and after the increase of the number of times of switching and obtain the stable direct-current voltage Vdc.

When the number of times of the short-circuit operation during the half cycle of the alternating-current power supply is reduced, the control unit sets the period after the reduction in the number of times of the short-circuit operation to be smaller than the period before the reduction in the number of times of the short-circuit operation. With this configuration, it is possible to suppress the fluctuation in the direct-current voltage Vdc before and after the decrease in the number of times of switching and obtain the stable direct-current voltage Vdc.

The control unit includes a driving-signal generating unit that generates a driving signal, which is an ON signal having width corresponding to the length of the period, and a pulse dividing unit that divides the driving signal into a plurality of switching pulses. The pulse dividing unit divides the driving signal into the plurality of switching pulses using data associating ON times of the plurality of switching pulses, OFF times of the plurality of switching pulses, and numbers of the plurality of switching pulses. With this configuration, complicated calculation in generating the plurality of driving signals Sa1 using the driving signal Sa is unnecessary. An increase in a design load of data set in the control unit 20 is not caused.

The control unit includes a driving-signal generating unit that generates a driving signal, which is an ON signal having width corresponding to the length of the period, and a pulse dividing unit that divides the driving signal into a plurality of switching pulses. The pulse dividing unit divides the driving signal into the plurality of switching pulses using data representing ON times of the plurality of switching pulses and OFF times of the plurality of switching pulses as functions based on numbers of the plurality of switching pulses. With this configuration, it is possible to specify on and off timings of the short-circuit unit 30 even if the number of times of switching increases. The control parameters stored in the control unit 20 can be reduced in number. Therefore, it is unnecessary to use an expensive memory. It is possible to reduce time and a load required for reliability verification or evaluation of the data. An increase in apparatus cost is not caused.

The data is data representing the ON time and the OFF time as an approximation formula of a second order or more. By using such data, it is possible to further reduce the control parameters stored in the data storing unit 23c. It is possible to greatly reduce time and a load required for reliability verification or evaluation of the data.

In the data, a rate of change of the OFF times of the plurality of switching pulses is larger than a rate of change of the ON times of the plurality of switching pulses. When such data is used, it is possible to obtain effect same as the effect obtained when the data represented by the approximation formula of a second order or more is used.

In the data, the ON time and the OFF time are set such that the power supply current is kept within a range from an upper limit threshold to a lower limit threshold smaller than the upper limit threshold within a period shorter than the half cycle of the alternating-current power supply. With this configuration, it is possible to raise the direct-current voltage Vdc while suppressing a peak of the power supply current Is. Because the peak of the power supply current Is can be suppressed, it is possible to suppress distortion of the power supply current Is at the time when the short-circuit unit 30 is turned on. It is possible to suppress a harmonic component. Because the peak of the power supply current Is can be suppressed, it is possible to extend a circulation period of the power supply current Is. It is possible to improve a power factor. Because the peak of the power supply current Is can be suppressed, it is possible to suppress an increase in capacities of a filter circuit and other components configuring the alternating-current power supply 1. It is possible to suppress an increase in cost.

The control unit includes a driving-signal generating unit that generates a driving signal, which is an ON signal having width corresponding to the length of the period, and a pulse dividing unit that divides the driving signal into a plurality of switching pulses. The pulse dividing unit divides the driving signal into the plurality of switching pulses using data representing on-duties of the plurality of switching pulses with respect to an ON time of the driving signal and off-duties of the plurality of switching pulses with respect to the ON time of the driving signal as functions based on numbers of the plurality of switching pulses. By using such data, it is possible to specify on and off timings of the short-circuit unit 30 even if the number of times of switching increases. The control parameters stored in the data storing unit 23c can be reduced in number. Therefore, it is unnecessary to use an expensive memory. It is possible to reduce time and a load required for reliability verification or evaluation of the data. An increase in apparatus cost is not caused.

The data is data representing the on-duties and the off-duties as an approximation formula of a second order or more. By using such data, it is possible to specify on and off timings of the short-circuit unit 30 even if the number of times of switching increases. It is possible to further reduce the control parameters stored in the data storing unit 23c. It is possible to greatly reduce time and a load required for reliability verification or evaluation of the data.

In the data, a rate of change of the off-duties of the plurality of switching pulses is larger than a rate of change of the on-duties of the plurality of switching pulses. When such data is used, it is possible to obtain effect same as the effect obtained when the data represented by the approximation formula of a second order or more is used.

In the data, the on-duties and the off-duties are set such that the power supply current is kept within a range from an upper limit threshold to a lower limit threshold smaller than the upper limit threshold within a period shorter than the half cycle of the alternating-current power supply. With this configuration, it is possible to raise the direct-current voltage Vdc while suppressing a peak of the power supply current Is. Because the peak of the power supply current Is can be suppressed, it is possible to suppress distortion of the power supply current Is at the time when the short-circuit unit 30 is turned on. It is possible to suppress a harmonic component. Because the peak of the power supply current Is can be suppressed, it is possible to extend a circulation period of the power supply current Is. It is possible to improve a power factor. Because the peak of the power supply current Is can be suppressed, it is possible to suppress an increase in capacities of a filter circuit and other components configuring the alternating-current power supply 1. It is possible to suppress an increase in cost.

In the data, an ON time of a first switching pulse is longer than ON times of second and subsequent switching pulses among pulse trains of the plurality of switching pulses. By using such data, compared with when the ON time of the first switching pulse is set to the same value as the ON times of the second and subsequent switching pulses, the number of times of switching of the driving signals Sa1 is reduced. It is possible to suppress a temperature rise and reduce noise through suppression of a loss of an element.

The control unit includes a data storing unit that stores the data. The control unit divides the driving signal into a plurality of switching pulses on the basis of the data stored in the data storing unit. With this configuration, in the control unit 20, it is possible to divide a pulse without inputting data from the outside of the control unit 20.

The control unit sets, within a period shorter than the half cycle of the alternating-current power supply, the period after the change of the number of times of the short-circuit operation to be different from the period before the change of the number of times of the short-circuit operation. Consequently, it is possible to suppress an electric current having polarity opposite to the polarity of the power supply voltage. It is possible to improve control stability and suppress power factor deterioration.

The power converting apparatus according to the first and second embodiments includes a power-supply-voltage detecting unit that detects a power supply voltage synchronized with the alternating-current power supply. The control unit sets the period after the change of the number of times of the short-circuit operation to be different from the period before the change of the number of times of the short-circuit operation in synchronization with the power supply voltage acquired by the power-supply-voltage detecting unit. The power converting apparatus according to the first and second embodiments includes a synchronization-signal detecting unit that detects a synchronization signal synchronized with the alternating-current voltage of the alternating-current power supply. The control unit sets the period after the change of the number of times of the short-circuit operation to be different from the period before the change of the number of times of the short-circuit operation in synchronization with the synchronization signal detected by the synchronization-signal detecting unit. By controlling the number of times of the short-circuit operation in synchronization with the power supply voltage, it is possible to switch the short-circuit unit at appropriate timing. It is possible to effectively achieve improvement of a power factor and suppression of harmonics. It is also possible to correct the number of times of the short-circuit operation according to fluctuation in the frequency of the alternating-current power supply voltage. It is possible to construct a system having high robustness.

The configurations explained in the embodiments indicate examples of content of the present invention. It is possible to combine the configurations with other publicly-known technologies. It is possible to omit and change a part of the configurations in a range not departing from the spirit of the present invention.

The invention claimed is:

1. A power converting apparatus comprising:
   a rectifier that converts alternating-current power from an alternating-current power supply into direct-current power;
   a short-circuit unit that short-circuits the alternating-current power supply via a reactor; and
   a control unit that controls a short-circuit operation of the short-circuit unit, wherein
   when a number of times of the short-circuit operation of the short-circuit unit during a half cycle of the alternating-current power supply is increased on the basis of a load condition, the control unit sets a first period from a start of a first short circuit operation to an end of all short circuit operations during the half cycle of the alternating-current power supply after the increase of the number of times of the short-circuit operation of the short-circuit unit larger than a second period from a start of a first short circuit operation to an end of all short circuit operations in the half cycle period of the alternating-current power supply before the increase of the number of times of the short-circuit operation of the short-circuit unit, and a sum of times in which the short-circuit unit is performing the short-circuit operation in the first period approaches a sum of times in which the short-circuit unit is performing the short-circuit operation in the second period.

2. The power converting apparatus according to claim 1, wherein
   the control unit includes:
   a driving-signal generating unit that generates a driving signal with which the short-circuit unit performs the short-circuit operation in the first period or the second period; and
   a pulse dividing unit that divides the driving signal into a plurality of switching pulses, and
   the pulse dividing unit divides the driving signal into the plurality of switching pulses using data associating ON times of the plurality of switching pulses, OFF times of the plurality of switching pulses, and numbers of the plurality of switching pulses.

3. The power converting apparatus according to claim 2, wherein, in the data, an ON time of a first switching pulse is longer than ON times of second and subsequent switching pulses among pulse trains of the plurality of switching pulses.

4. The power converting apparatus according to claim 2, wherein the control unit includes a data storing unit that stores the data, the control unit dividing the driving signal into a plurality of switching pulses on the basis of the data stored in the data storing unit.

5. The power converting apparatus according to claim 1, wherein
   the control unit includes:
   a driving-signal generating unit that generates a driving signal with which the short-circuit unit performs the short-circuit operation in the first period or the second period; and
   a pulse dividing unit that divides the driving signal into a plurality of switching pulses, and
   the pulse dividing unit divides the driving signal into the plurality of switching pulses using data representing ON times of the plurality of switching pulses and OFF times of the plurality of switching pulses as functions based on numbers of the plurality of switching pulses.

6. The power converting apparatus according to claim 5, wherein the data is data representing the ON time and the OFF time as an approximation formula of a second order or more.

7. The power converting apparatus according to claim 6, wherein, in the data, a rate of change of the OFF times of the plurality of switching pulses is larger than a rate of change of the ON times of the plurality of switching pulses.

8. The power converting apparatus according to claim 5, wherein, in the data, the ON time and the OFF time are set such that the power supply current is kept within a range from an upper limit threshold to a lower limit threshold smaller than the upper limit threshold within a period shorter than the half cycle of the alternating-current power supply.

9. The power converting apparatus according to claim 5, wherein, in the data, an ON time of a first switching pulse is longer than ON times of second and subsequent switching pulses among pulse trains of the plurality of switching pulses.

10. The power converting apparatus according to claim 5, wherein the control unit includes a data storing unit that stores the data, the control unit dividing the driving signal into a plurality of switching pulses on the basis of the data stored in the data storing unit.

11. The power converting apparatus according to claim 1, wherein
    the control unit includes:
    a driving-signal generating unit that generates a driving signal with which the short-circuit unit performs the short-circuit operation in the first period or the second period; and
    a pulse dividing unit that divides the driving signal into a plurality of switching pulses, and
    the pulse dividing unit divides the driving signal into the plurality of switching pulses using data representing on-duties of the plurality of switching pulses with respect to an ON time of the driving signal and off-duties of the plurality of switching pulses with respect to the ON time of the driving signal as functions based on numbers of the plurality of switching pulses.

12. The power converting apparatus according to claim 11, wherein, in the data, the on-duties and the off-duties are set such that the power supply current is kept within a range from an upper limit threshold to a lower limit threshold smaller than the upper limit threshold within a period shorter than the half cycle of the alternating-current power supply.

13. The power converting apparatus according to claim 11, wherein the data is data representing the on-duties and the off-duties as an approximation formula of a second order or more.

14. The power converting apparatus according to claim 13, wherein, in the data, a rate of change of the off-duties of the plurality of switching pulses is larger than a rate of change of the on-duties of the plurality of switching pulses.

15. The power converting apparatus according to claim 11, wherein, in the data, an ON time of a first switching pulse is longer than ON times of second and subsequent switching pulses among pulse trains of the plurality of switching pulses.

16. The power converting apparatus according to claim 11, wherein the control unit includes a data storing unit that stores the data, the control unit dividing the driving signal into a plurality of switching pulses on the basis of the data stored in the data storing unit.

17. The power converting apparatus according to claim 1, further comprising a synchronization-signal detecting unit that detects a synchronization signal synchronized with an alternating-current voltage of the alternating-current power supply, wherein
  the control unit sets the first period larger than the second period in synchronization with the synchronization signal acquired by the synchronization-signal detecting unit.

18. The power converting apparatus according to claim 1, wherein the control unit is configured by a microcomputer.

19. The power converting apparatus according to claim 1, further comprising a power-supply-voltage detecting unit that detects a power supply voltage synchronized with the alternating-current power supply, wherein
  the control unit sets the first period larger than the second period in synchronization with the power supply voltage acquired by the power-supply-voltage detecting unit.

20. A power converting apparatus comprising:
  a rectifier that converts alternating-current power from an alternating-current power supply into direct-current power;
  a short-circuit unit that short-circuits the alternating-current power supply via a reactor; and
  a control unit that controls short-circuit operation of the short-circuit unit, wherein, when a number of times of the short-circuit operation of the short-circuit unit during the half cycle of the alternating-current power supply is reduced on the basis of a load condition, the control unit sets a first period from a start of a first short circuit operation to an end of all short circuit operations during the half cycle of the alternating-current power supply after the reduction of the number of times of the short-circuit operation of the short-circuit unit smaller than a second period from a start of a first short circuit operation to an end of all short circuit operations in the half cycle period of the alternating-current power supply before the reduction of the number of times of the short-circuit operation of the short-circuit unit, and a sum of times in which the short-circuit unit is performing the short-circuit operation in the second period approaches a sum of times in which the short-circuit unit is performing the short-circuit operation in the first period.

21. The power converting apparatus according to claim 20, wherein the control unit includes:
  a driving-signal generating unit that generates a driving signal with which the short-circuit unit performs the short-circuit operation in the first period or the second period; and
  a pulse dividing unit that divides the driving signal into a plurality of switching pulses, and
  the pulse dividing unit divides the driving signal into the plurality of switching pulses using data associating ON times of the plurality of switching pulses, OFF times of the plurality of switching pulses, and numbers of the plurality of switching pulses.

22. The power converting apparatus according to claim 21, wherein, in the data, an ON time of a first switching pulse is longer than ON times of second and subsequent switching pulses among pulse trains of the plurality of switching pulses.

23. The power converting apparatus according to claim 21, wherein the control unit includes a data storing unit that stores the data, the control unit dividing the driving signal into a plurality of switching pulses on the basis of the data stored in the data storing unit.

24. The power converting apparatus according to claim 20, wherein
  the control unit includes:
    a driving-signal generating unit that generates a driving signal with which the short-circuit unit performs the short-circuit operation in the first period or the second period; and
    a pulse dividing unit that divides the driving signal into a plurality of switching pulses, and
  the pulse dividing unit divides the driving signal into the plurality of switching pulses using data representing ON times of the plurality of switching pulses and OFF times of the plurality of switching pulses as functions based on numbers of the plurality of switching pulses.

25. The power converting apparatus according to claim 24, wherein the data is data representing the ON time and the OFF time as an approximation formula of a second order or more.

26. The power converting apparatus according to claim 25, wherein, in the data, a rate of change of the OFF times of the plurality of switching pulses is larger than a rate of change of the ON times of the plurality of switching pulses.

27. The power converting apparatus according to claim 24, wherein, in the data, the ON time and the OFF time are set such that the power supply current is kept within a range from an upper limit threshold to a lower limit threshold smaller than the upper limit threshold within a period shorter than the half cycle of the alternating-current power supply.

28. The power converting apparatus according to claim 24, wherein, in the data, an ON time of a first switching pulse is longer than ON times of second and subsequent switching pulses among pulse trains of the plurality of switching pulses.

29. The power converting apparatus according to claim 24, wherein the control unit includes a data storing unit that stores the data, the control unit dividing the driving signal into a plurality of switching pulses on the basis of the data stored in the data storing unit.

30. The power converting apparatus according to claim 20, wherein
  the control unit includes:
    a driving-signal generating unit that generates a driving signal with which the short-circuit unit performs the short-circuit operation in the first period or the second period; and
    a pulse dividing unit that divides the driving signal into a plurality of switching pulses, and
  the pulse dividing unit divides the driving signal into the plurality of switching pulses using data representing on-duties of the plurality of switching pulses with respect to an ON time of the driving signal and off-duties of the plurality of switching pulses with respect to the ON time of the driving signal as functions based on numbers of the plurality of switching pulses.

31. The power converting apparatus according to claim 30, wherein, in the data, the on-duties and the off-duties are set such that the power supply current is kept within a range from an upper limit threshold to a lower limit threshold smaller than the upper limit threshold within a period shorter than the half cycle of the alternating-current power supply.

32. The power converting apparatus according to claim 30, wherein the data is data representing the on-duties and the off-duties as an approximation formula of a second order or more.

33. The power converting apparatus according to claim 32, wherein, in the data, a rate of change of the off-duties of the plurality of switching pulses is larger than a rate of change of the on-duties of the plurality of switching pulses.

34. The power converting apparatus according to claim 30, wherein, in the data, an ON time of a first switching pulse is longer than ON times of second and subsequent switching pulses among pulse trains of the plurality of switching pulses.

35. The power converting apparatus according to claim 30, wherein the control unit includes a data storing unit that stores the data, the control unit dividing the driving signal into a plurality of switching pulses on the basis of the data stored in the data storing unit.

36. The power converting apparatus according to claim 20, further comprising a synchronization-signal detecting unit that detects a synchronization signal synchronized with an alternating-current voltage of the alternating-current power supply, wherein
  the control unit sets the first period smaller than the second period in synchronization with the synchronization signal acquired by the synchronization-signal detecting unit.

37. The power converting apparatus according to claim 20, wherein the control unit is configured by a microcomputer.

38. The power converting apparatus according to claim 20, further comprising a power-supply-voltage detecting unit that detects a power supply voltage synchronized with the alternating-current power supply, wherein
  the control unit sets the first period smaller than the second period in synchronization with the power supply voltage acquired by the power-supply-voltage detecting unit.

* * * * *